United States Patent [19]

Matsui et al.

[11] Patent Number: 5,216,494
[45] Date of Patent: Jun. 1, 1993

[54] DEVICE FOR SEPARATING LUMINANCE AND COLOR BASED ON LINE CORRELATION

[75] Inventors: Hideaki Matsui; Masanori Kojima, both of Nagaokakyo, Japan

[73] Assignee: Mitsubishi Denki Kabushiki Kaisha, Tokyo, Japan

[21] Appl. No.: 696,163

[22] Filed: May 6, 1991

[30] Foreign Application Priority Data

May 15, 1990 [JP] Japan .................................. 2-125987

[51] Int. Cl.⁵ .............................................. H04N 9/64
[52] U.S. Cl. .................................................. 358/31
[58] Field of Search ........................................ 358/31

[56] References Cited

U.S. PATENT DOCUMENTS

| | | | |
|---|---|---|---|
| 4,179,705 | 12/1979 | Faroudja | 358/31 |
| 4,240,105 | 12/1980 | Faroudja | 358/31 |
| 4,456,922 | 6/1984 | Balaban et al. | 358/31 |
| 4,626,894 | 12/1986 | Harwood et al. | 358/31 |
| 4,916,527 | 4/1990 | Matsuo | 358/31 |
| 4,954,885 | 9/1990 | Ito et al. | 358/31 |
| 5,001,553 | 3/1991 | Matsuo et al. | 358/31 |
| 5,025,311 | 6/1991 | Hosoi | 358/31 |
| 5,051,818 | 9/1991 | Mishima | 358/31 |
| 5,132,784 | 7/1992 | Hague et al. | 358/31 |

Primary Examiner—John K. Peng
Assistant Examiner—Jeffrey S. Murrell

[57] ABSTRACT

In a Y/C separator, a computed signal is obtained through computation on from a signal of a color carrier signal band in a Y/C composite video signal and a delayed signal obtained by delaying the signal of the color carrier signal band by a 1 H period. The computation includes one for producing an absolute value, one for producing a smaller one of a plurality of signals, and subtraction and addition. Under control of the computed signal and a reference signal, a color carrier signal is produced in accordance with the signal of the color carrier signal band and a signal obtained by comb filtering the signal of the color carrier signal band.

15 Claims, 23 Drawing Sheets

IN THE HATCHED AREA, COMPUTED LEVEL < THRESHOLD

DEVICE FOR SEPARATING LUMINANCE AND COLOR BASED ON LINE CORRELATION

FIELD OF THE INVENTION

This invention relates to video signal processing technology, especially to a Y/C separator device for separating the luminance and color carrier signals from the video signal.

BACKGROUND OF THE INVENTION

FIG. 32 illustrates a block diagram of a conventional prior art Y/C separator widely used in video tape recorders, TV receivers and other equipment. In the prior art diagram, an input terminal 1 is for input of the Y/C composite video signal. A bandpass filter 2 is for separating a signal of the color carrier signal band, a 1 H delay line 3 is for delaying the color carrier signal by a 1 H period, and a subtractor 4 is for subtracting the output of the 1 H delay line 3 from the output of the bandpass filter 2. An output terminal 5 is for outputting the color carrier signal output, a delay device 6 is for delaying the signal, and a subtractor 7 is for subtracting the output of the subtractor 4 from the output of the delay device 6. An output terminal 8 is for outputting the luminance signal.

The bandpass filter 2 extracts only the video signal in the color carrier signal band from the Y/C composite video signal via the input terminal 1. This goes to the 1 H delay line 3 and the subtractor 4. The signal is delayed by the 1 H delay line 3 by a 1 H period equivalent to one horizontal scanning line and supplied to the subtractor 4.

In the NTSC system color signal, in order to avoid mutual effects between the luminance and color carrier signals, the relationship between the color carrier signal Fsc and horizontal sync signal fH is set at $$Fsc = (fH/2) \times 455 = \text{approx. } 3.58 \text{ MHz}$$

The color carrier signal is overlapped on the high band component of the luminance signal. When this relationship exists, the color carrier signal whose polarity reverses every frame mutually cancels. Also, in the correlation between adjacent scanning lines, phase is reversed and is averaged, thus the effects of the color carrier on the luminance signal become indistinguiushable.

However, since line correlation is strong between mutually adjacent scanning lines, the luminance signal waveform remains substantially the same, but the color carrier phase reverses, as mentioned above.

This relationship is maintained even between the two signals input to the subtractor 4.

The subtractor 4 yields only the color carrier signal component through the process $(Y+C)-(Y-C)=2C$. For the sake of simplicity of explanation, it is assumed that this is attenuated ½ to produce output C.

The color carrier signal separated by the subtractor 4 is sent to both output terminal 5 and the subtractor 7.

The delay device 6 functions to adjust the timing between the Y/C composite video signal from the input terminal 1 and the separated color carrier signal from the subtractor 4, at the inputs of the subtractor 7.

The subtractor 7 yields the luminance signal only by $(Y+C)-C=Y$. The luminance signal output goes to the output terminal 8.

Since the conventional Y/C separator is composed in the above manner, if the line correlation of the color carrier signal is extremely weak (for example, a change in the vertical direction in the picture such as from presence of color to absence of color), precise Y/C separation cannot be performed. Interference signals are therefore produced in the separated color carrier signal. Moreover, the same interference signals are produced in the separated luminance signal. Consequently, the problem of dot interference produced in the picture arises.

SUMMARY OF THE INVENTION

This invention resolves to resolve the above problem, and its object is to provide a Y/C separator device in which, during periods when line correlation is absent in the color carrier signal, interference arising in the separated color carrier signal can be removed or reduced, and at the same time, interference arising in the separated luminance signal can also be removed or reduced.

A Y/C separator according to the present invention produces a computed signal which is obtained through computation of a signal of a color carrier signal band in a Y/C composite video signal and a delayed signal obtained by delaying the signal of the color carrier signal band by a 1 H period. The computation includes one for producing an absolute value, one for producing a smaller one of a plurality of signals, and subtraction and addition. That is, either one of the computations (a) to (d) is performed.

(a): $i \text{ MIN}(|\alpha|, |\beta|) - j ||\alpha| - |\beta||$ (b): $i \text{ MIN}(|\alpha|, |\beta|) - j \text{ MIN}(|\alpha-\beta|, |\alpha+\beta|)$ (c): $i \text{ MIN}(|\alpha|, |\beta|)$ (d): $i |\alpha-\beta|$ (where i and j are coefficients within the range of $-1$ to $+1$. This computed signal and a reference signal are used for production of a color carrier signal. For production of the color carrier signal, a switching device may be used and controlled by the output signal of the computed signal and a reference voltage for selectively outputting one of said signal of the color carrier signal band and a signal obtained by comb filtering the signal of the color carrier signal band.

Alternatively, a variable mixer may be used and controlled by the output signal of the computed signal and a reference voltage for producing the color carrier signal with a varied mixing ratio between the signal of the color carrier signal band and a signal obtained by comb filtering said signal of the color carrier signal band.

In the Y/C separator of the present invention, the computed signal becomes minimum at the color carrier signal rising and falling edges.

In the embodiments using a switching device, when the computed signal is greater than the reference voltage, the switching device is controlled to produce the comb filtered signal output. When the computed signal is smaller than the reference voltage, the switching device is controlled to produce the original signal.

In the embodiments using the variable mixer, when the computed signal is greater than the reference voltage, the variable mixer is controlled to increase the mixing ratio of the comb filtered signal. When the computed signal is smaller than the reference voltage, the mixing ratio of the original signal of the color carrier signal band is increased.

In this way, more precise C separation is achieved. Also, this C separated color carrier signal is subtracted from the Y/C composite video signal to perform more precise Y separation.

DETAILED DESCRIPTION OF THE PREFERRED EMBODIMENTS

Following is a description of the embodiments of the invention with respect to the figures.

Figure 1:
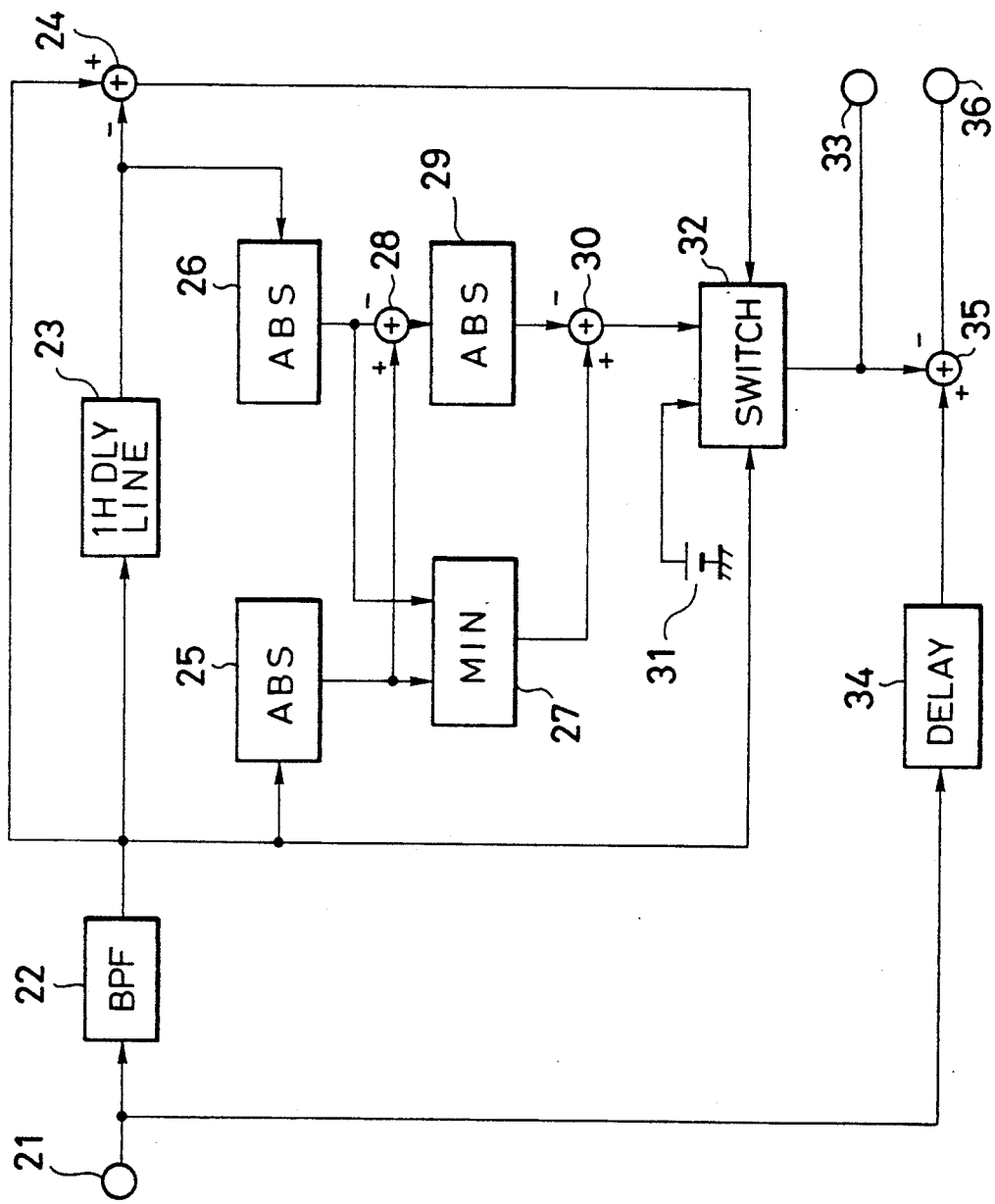
FIG. 1 is a block diagram of an embodiment of the invention.

FIG. 1 illustrates a first embodiment of the Y/C separator according to this invention. In the figure, an input terminal 21 is for input of the Y/C composite video signal; a bandpass filter 22 is for separating the color carrier band component from the Y/C composite video signal via the input terminal 21; a 1 H delay line 23 is for delaying the signal of the color carrier band component from the bandpass filter; a subtractor 24 is for subtracting the 1 H delayed signal output by the 1 H delay line 23 from the output of the bandpass filter 22; and an absolute value converter 25 is for producing the absolute value of the signal obtained from the bandpass filter 22.

Another absolute value converter 26 is for producing the absolute value of the 1 H delayed signal from the delay line 23. A minimum value selector 27 is for providing the lower of the outputs from the absolute value converters 25 and 26. A subtractor 28 is for subtracting the output of the absolute value converter 26 from the output of the absolute value converter 25. An absolute value converter 29 is for producing the absolute value of the signal from the subtractor 28. A subtractor 30 is for subtracting the output signal of the absolute value converter 29 from the output signal of the minimum value selector 27.

A switching device 32 is controlled by the output signal from the subtractor 30 and selects one of the signals from the bandpass filter 22 and the subtractor 24. When the control signal is higher than a fixed threshold or reference voltage 31, the output signal of the subtractor 24 is selected.

An output terminal 33 is for outputting the color carrier signal selected by the switching device 32. A delay device 34 is for adjusting the timing of the Y/C composite video signal input via the input terminal 21 with the timing of the color carrier signal from the switching device 32. A subtractor 35 is for subtracting the color carrier signal output by the switching device 32 from the Y/C composite video signal output by the delay device 34. An output terminal 36 is for outputting the luminance signal obtained from the subtractor 35.

As mentioned in the description of the prior art, when line correlation is present in the color carrier signal in the NTSC system, the waveform levels of adjacent scanning lines are essentially equal, resulting in an opposite phase relationship. However, when line correlation is not present, either the waveform level differs between adjacent scanning lines or the opposite phase relationship cannot be maintained, or both these conditions occur.

Let us denote the original color carrier signal as $\alpha$ and the 1 H delayed signal as $\beta$. When signal $\alpha$ is reversed in phase and delayed 1 H, if line correlation is present, the level of the signal $\alpha$ becomes essentially the same as the level of the signal $\beta$. Conversely, when line correlation is absent, if the color carrier signal waveform level or the phase fluctuates, a level difference appears between signal $\alpha$ and signal $\beta$. Consequently, when line correlation is absent in the color carrier signal, either the level of the signal $|\alpha|$ and the level of the signal $|\beta|$ differ from each other (one is appreciably smaller than the other. Conversely, line correlation is present when the levels of the signals $|\alpha|$ and $|\beta|$ are equal.

Figure 2:
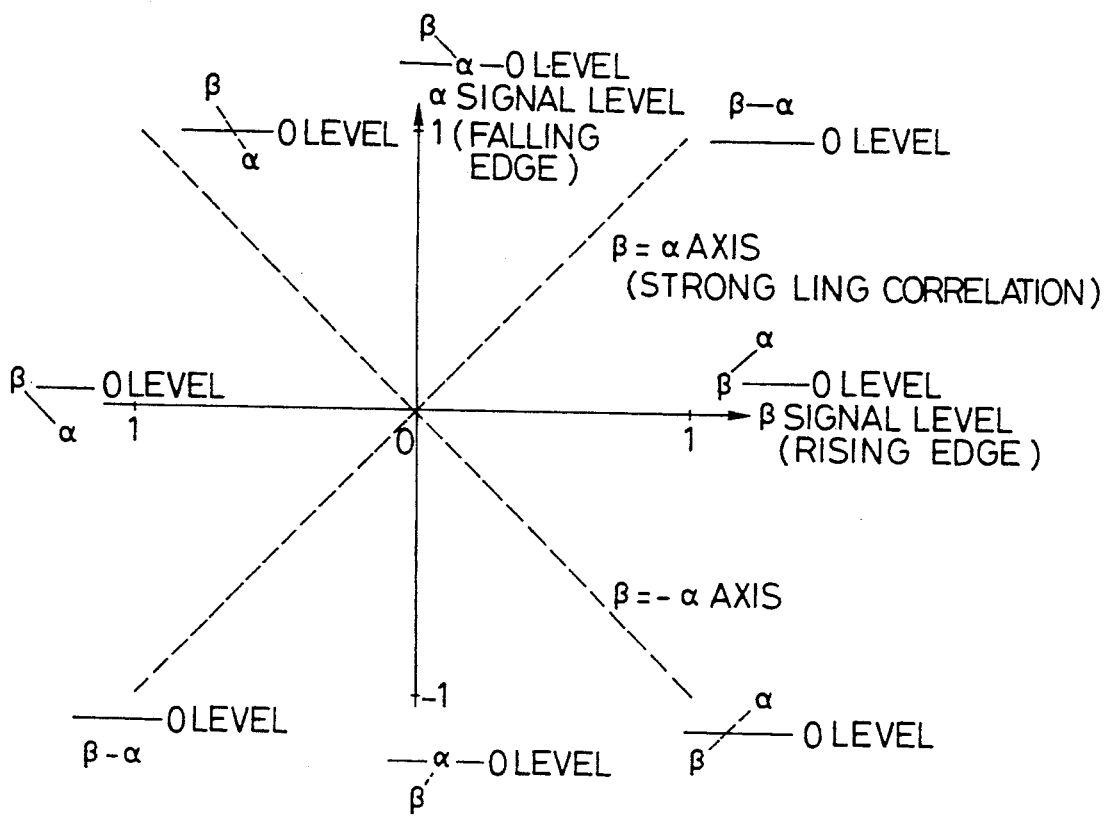
FIG. 2 illustrates the state of the $\alpha$ and $\beta$ signal levels.

FIG. 2 illustrates this principle in the form of a graph. In FIG. 2, the vertical axis is the signal $\beta$ level and the horizontal axis is the signal $\alpha$ level. According to the graph, on $\beta=\alpha$ axis, level and phase are the same. On $\beta=-\alpha$ axis, the level is the same, but phase is opposite (i.e., cross color component). The $\beta$ and $\alpha$ axes represent the level fluctuation, i.e., rising edge and falling edge. Consequently, line correlation is present only in the proximity of the $\beta=\alpha$ axis.

Figure 3:
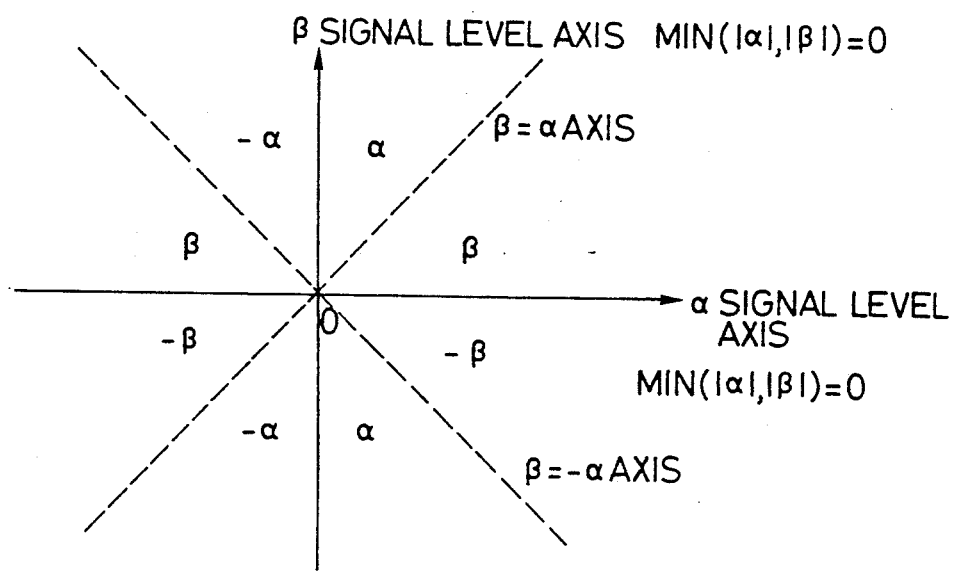
FIG. 3 illustrates the states of MIN ($|\alpha|$, $|\beta|$).

FIG. 3 is a graph of MIN $(|\alpha|, |\beta|)$. On the $\beta$ and $\alpha$ axes, MIN $(|\alpha|, |\beta|)=0$, which is the minimum value. On the $\beta=\alpha$ and $\beta=-\alpha$ axes, MIN $(|\alpha|, |\beta|=|\alpha|$ or $|\beta|$.

Figure 4:
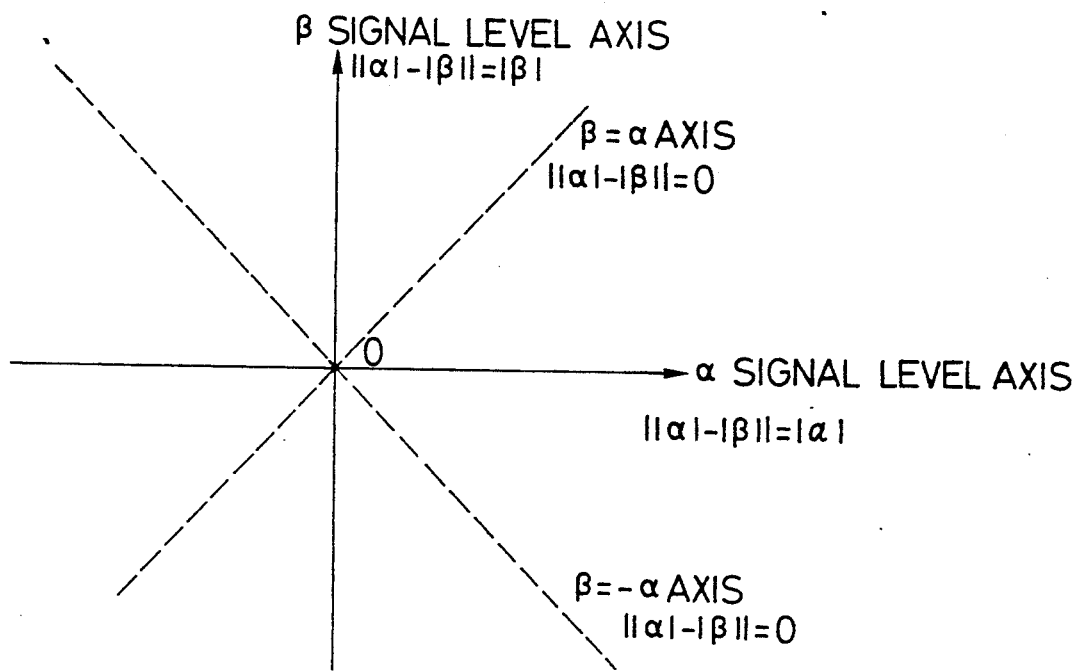
FIG. 4 illustrates the states of $||\alpha|-|\beta||$.

FIG. 4 is a graph of $||\alpha|-|\beta||$. On the $\beta=\alpha$ and $\beta=-\alpha$ axes. $||\alpha|-|\beta||=0$, which is the minimum value. On the $\beta$ and $\alpha$ signal level axes, $||\alpha|-|\beta||=|\beta|$ or $|\alpha|$.

Figure 5:
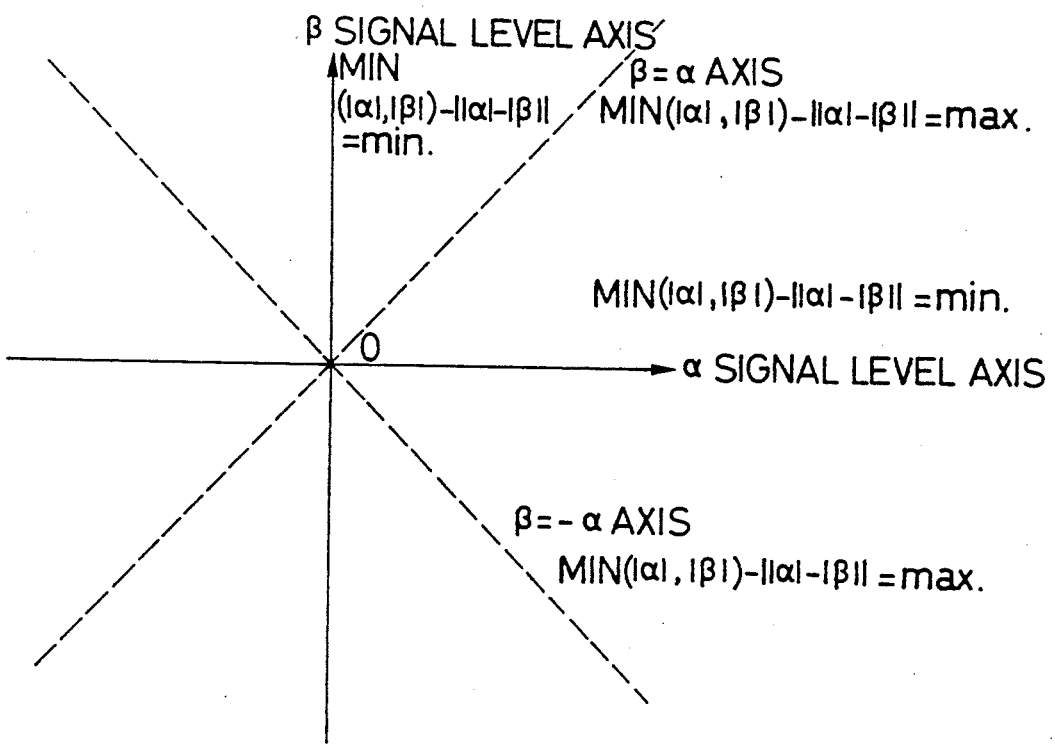
FIG. 5 illustrates the states of MIN ($|\alpha|$, $|\beta|$)$-||\alpha|-|\beta||$.

FIG. 5 is derived from FIG. 3 and FIG. 4, plotting MIN $(|\alpha|, |\beta|)-||\alpha|-|\beta||$. On the $\alpha$ signal level axis, MIN $(|\alpha|, |\beta|)-||\alpha|-|\beta||=-|\alpha|$. On the $\beta$ signal level axis, MIN $(|\alpha|, |\beta|)-||\alpha|-|\beta||=-|\beta|$. On the $\beta=\alpha$ axis, and on the $\beta=-\alpha$ axis, MIN $(|\alpha|, |\beta|)-||\alpha|-|\beta||=|\alpha|$ or $|\beta|$.

For a better understanding of the above, let us consider a circle of radius 1 centered on the origin point 0.

Figure 6:
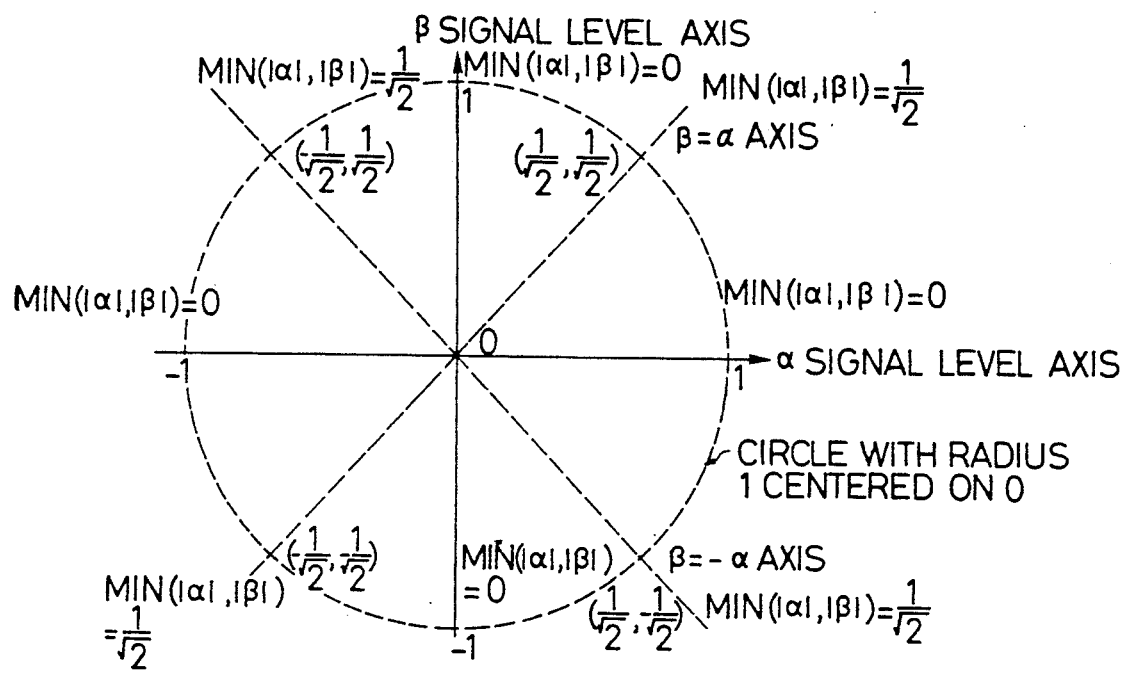
FIG. 6 illustrates the states of MIN ($|\alpha|$, $|\beta|$) using a circle with origin point 0 and radius 1.

FIG. 6 illustrates MIN $(|\alpha|, |\beta|)$. At $(\alpha, \beta)=(1, 0)$, $(0, 1), (-1, 0)$ and $(0, -1)$; MIN $(|\alpha|, |\beta|)=0$, which is the minimum value. At $(\alpha, \beta)=(\frac{1}{2}^\frac{1}{2}, \frac{1}{2}^\frac{1}{2})$, $(-\frac{1}{2}^\frac{1}{2}, \frac{1}{2}^\frac{1}{2})$, $(-\frac{1}{2}^\frac{1}{2}, -\frac{1}{2}^\frac{1}{2})$ and $(\frac{1}{2}^\frac{1}{2}, -\frac{1}{2}^\frac{1}{2})$; MIN $(|\alpha|, |\beta|)=\frac{1}{2}^\frac{1}{2}$, which is the maximum value.

Figure 7:
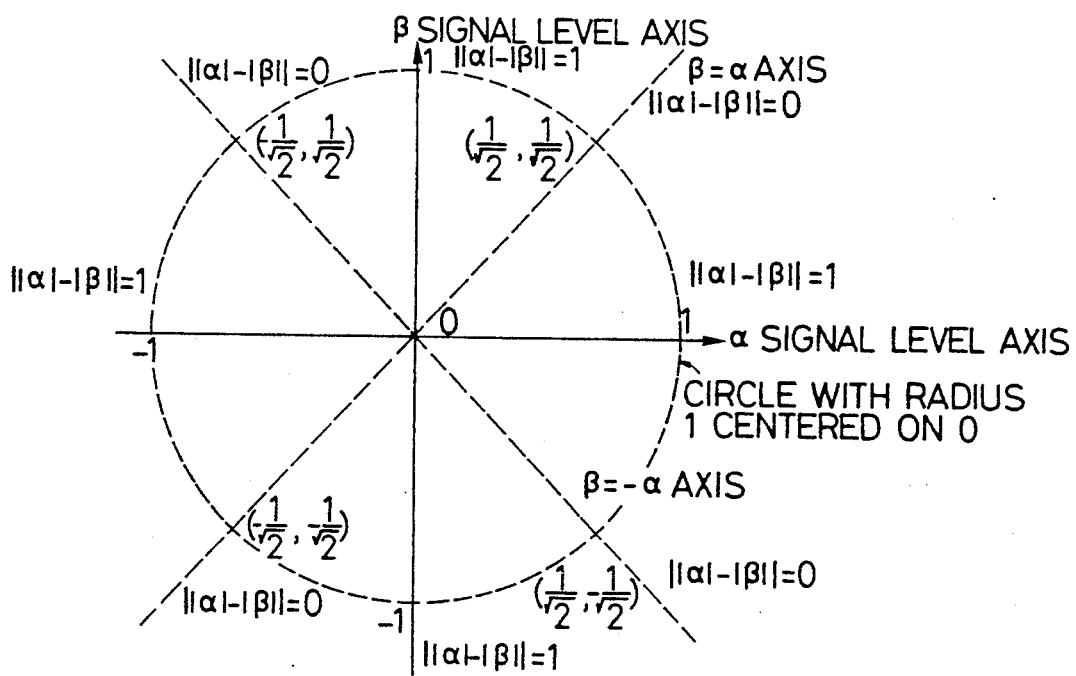
FIG. 7 illustrates the states of $||\alpha|-|\beta||$ using a circle with origin point 0 and radius 1.

FIG. 7 illustrates $(|\alpha|-|\beta|)$. At $(\alpha, \beta)=(\frac{1}{2}^\frac{1}{2}, \frac{1}{2}^\frac{1}{2})$, $-\frac{1}{2}^\frac{1}{2}, -\frac{1}{2}^\frac{1}{2})$, $(-\frac{1}{2}^\frac{1}{2}, \frac{1}{2}^\frac{1}{2})$ and $(\frac{1}{2}^\frac{1}{2}, -\frac{1}{2}^\frac{1}{2})$; $(|\alpha|-|\beta|)=0$, which is the minimum value. At $(\alpha, \beta)=(1, 0), (0, 1)$, $(-1, 0)$ and $(0, -1)$; $(|\alpha|-|\beta|)=1$, which is the maximum value.

Figure 8:
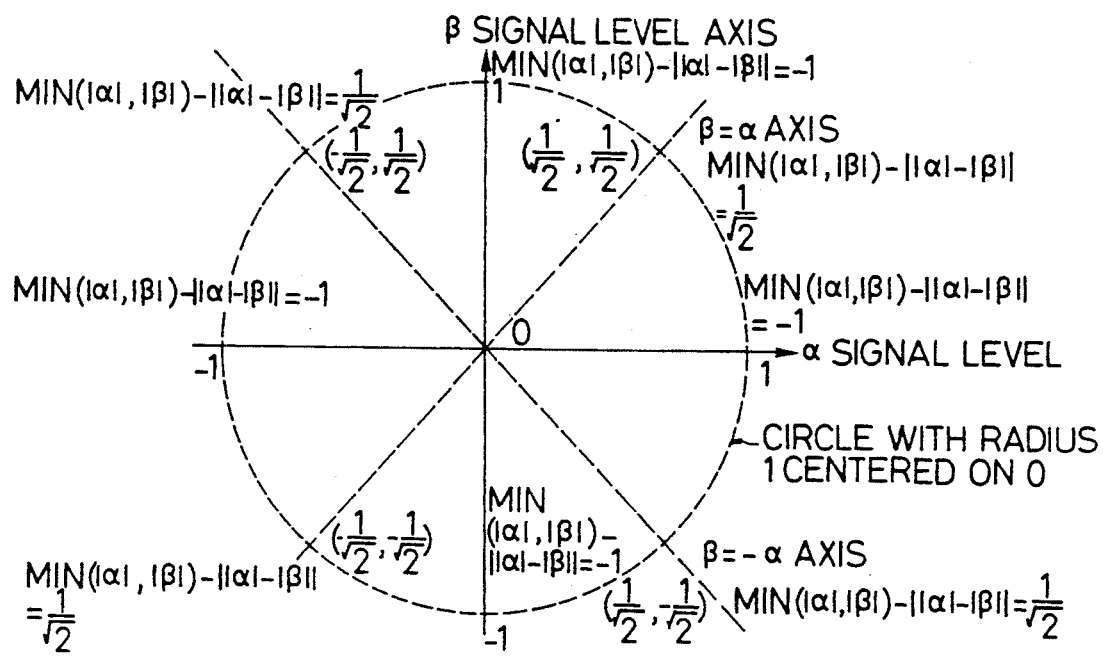
FIG. 8 illustrates the states of MIN ($|\alpha|$, $|\beta|$)$-||\alpha|-|\beta||$ using a circle with origin point 0 and radius 1.

FIG. 8 illustrates MIN $(|\alpha|, |\beta|)-||\alpha|-|\beta||$, which is derived from FIG. 6 and FIG. 7. At $(\alpha, \beta)=(1, 0), (0, 1), (-1, 0)$ and $(0, -1)$; MIN $(|\alpha|, |\beta|)-||\alpha|-|\beta||=-1$, which is the minimum value. At $(\alpha, \beta)=(\frac{1}{2}^\frac{1}{2}, \frac{1}{2}^\frac{1}{2}), (-\frac{1}{2}^\frac{1}{2}, \frac{1}{2}^\frac{1}{2})$, $-\frac{1}{2}^\frac{1}{2}, -\frac{1}{2}^\frac{1}{2})$ and $(\frac{1}{2}^\frac{1}{2}, -\frac{1}{2}^\frac{1}{2})$; MIN $(|\alpha|, |\beta|)-||\alpha|-|\beta||=\frac{1}{2}^\frac{1}{2}$, which is the maximum value.

Figure 9:
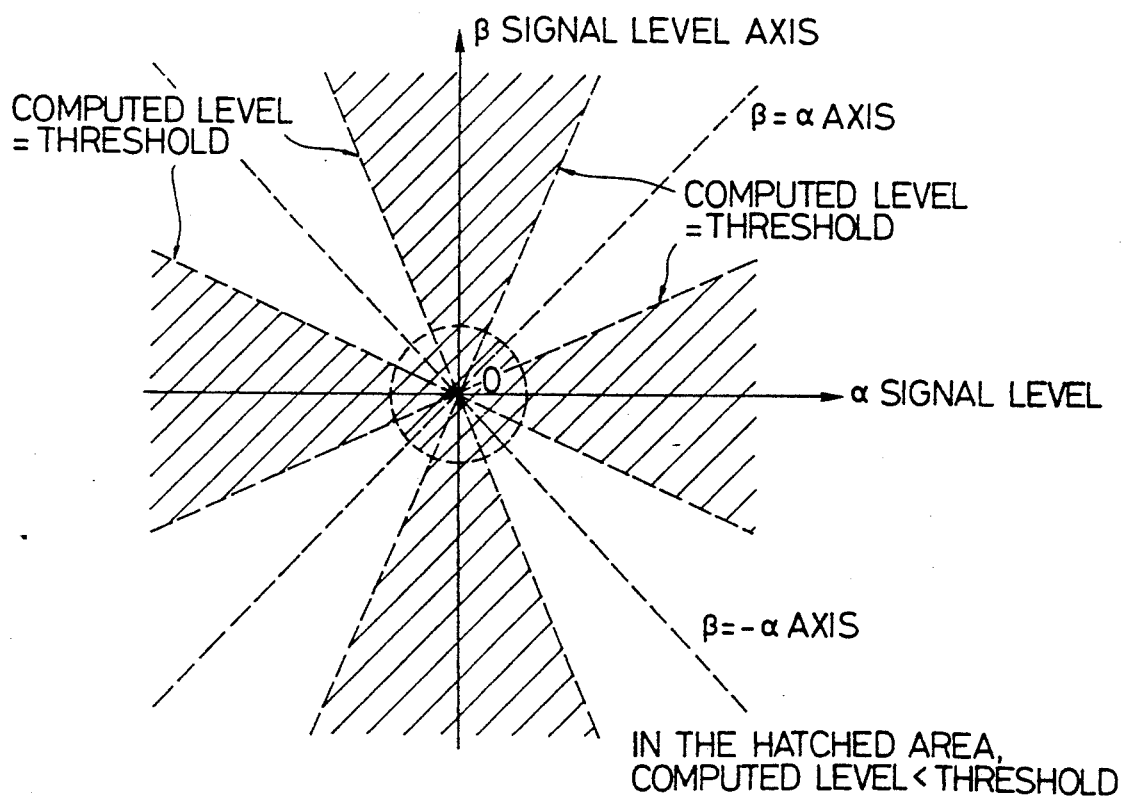
FIG. 9 illustrates detectable ranges of computed signal and reference or threshold level.

It will be understood from the above discussion, that by comparing the signal obtained from computing MIN $(|\alpha|, |\beta|)-||\alpha|-|\beta||$ with a certain threshold (for example, voltage corresponding to a computed signal level of 0.2), the ranges near the $\beta$ and $\alpha$ axes, and those outside this region can be discriminated. This is illustrated in FIG. 9.

In again looking at FIG. 2, the color carrier signal rising and falling edges appear on the $\alpha$ and $\beta$ axes. Since line correlation is absent, error signals are produced when the prior art comb filter is used, and as a result dot interference appears in the picture. In order to eliminate this, by using, in place of the comb filtered signal, the original signal at the color carrier signal rising and falling edges, dot interference can be removed (or reduced) in these components.

By using the above signal computed by MIN $(|\alpha|, |\beta|)-||\alpha|-|\beta||$ as the control signal, the output between the original signal and comb filtered signal, the above mentioned problem can be eliminated.

Following is a description of the operation of this embodiment with reference to FIG. 1.

The bandpass filter 22 separates the signal in the color carrier signal band from Y/C composite video signal via the input terminal 21. The signal from the bandpass filter 22 is supplied via 1 H delay line 23 and the subtractor 24, chroma-comb filter treated, and then supplied to the switching device 32. The level of the signal output from subtractor 24 is the same as the signal level sent directly from bandpass filter 22 to switching device 32.

Further, the absolute value converter 25 converts the output of the bandpass filter 22 into an absolute value which corresponds to the above $|\alpha|$, which goes to the minimum signal selector 27. The 1 H delayed signal from the 1 H delay line 23 is converted into an absolute value, which corresponds to the above $|\beta|$, which also goes to the minimum signal selector 27. The lesser level signal, which corresponds to the above MIN $(|\alpha|, |\beta|)$, is selected and sent to the subtractor 30.

The output signal of the absolute value converter 25, which corresponds to the above $|\alpha|$, and the output signal of the absolute value converter 26, which corresponds to the above $|\beta|$, go to the subtractor 28 for producing a difference signal, which corresponds to the above $|\alpha|-|\beta|$. The difference signal is supplied to the absolute value converter 29, which produces an absolute value, which corresponds to the above $||\alpha|-|\beta||$, which goes to the subtractor 30. The subtractor 30 produces the required computed signal MIN $(|\alpha|, |\beta|)-||\alpha|-|\beta||$, which is sent to the switching device 32.

Figure 10:
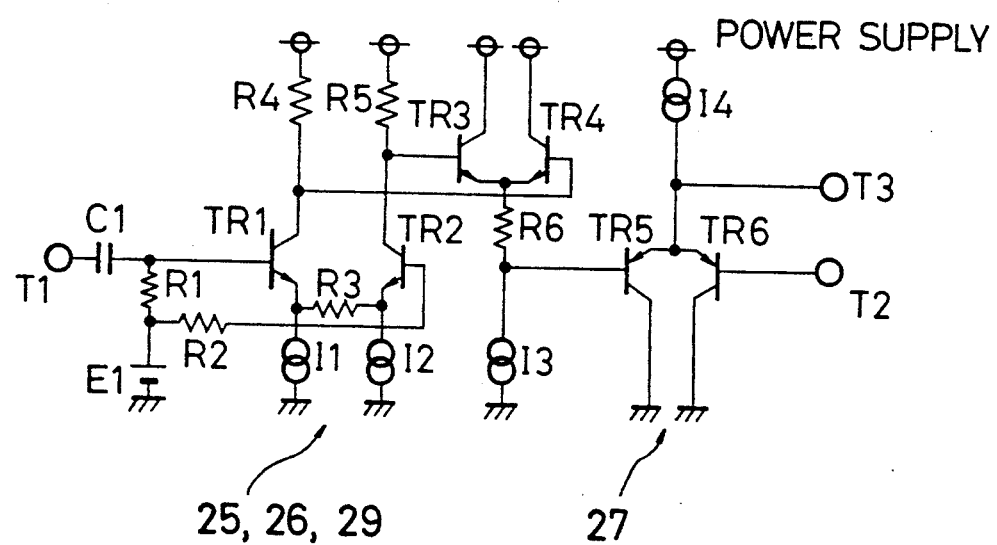
FIG. 10 shows an example of circuit for the absolute value converter and minimum value selector.

FIG. 10 illustrates circuit examples for the absolute value converters 25, 26 and 29, and for the minimum value selector 27.

In the figure, TR1-TR4 are NPN transistors, TR5 and TR6 are PNP transistors, R1-R6 are resistors, I1-I4 are constant current sources, E1 is a constant DC bias voltage, C1 is a coupling capacitor, T1 and T2 are input terminals, and T3 is an output terminal.

The input signal via the input terminal T1 is amplified to the required gain by the differential amplifier comprised of the transistors TR1 and TR2 (the gain is taken as 0 dB in this example). A signal of the same phase as the input signal is produced via the resistor R5, while a signal of the reverse phase to the input signal is produced via the resistor R4.

The signals are supplied to the bases of the transistors TR3 and TR4. Since the emitters of the transistors TR3 and TR4 are connected, when the voltage between the bases rises above Vbe (approximately 0.7 V (d.c.)), the transistor with the higher base potential conducts, while the transistor with the lower base potential is cutoff. Consequently, the absolute value of the T1 input signal is obtained at the emitters of the transistors TR3 and TR4.

The resistor R6 shifts the level of the converted signal, which goes to base of the transistor TR5. An absolute value signal produced in the same manner is supplied via the terminal T2 to the base of the transistor TR6. The absolute value signals at the bases of the transistors TR5 and TR6 are at absolute value 0 level and have identical DC potential.

Since the emitters of the transistors TR5 and TR6 are connected, when the voltage between the bases rises above Vbe (approximately 0.7 V (d.c.)), the transistor with the lower base potential conducts, while the transistor with the higher base potential is cutoff. Consequently, the smaller level of the signals at the bases of the transistors TR5 and TR6 appears at the emitters of the transistors TR5 and TR6.

The computed signal MIN $(|\alpha|, |\beta|) - ||\alpha| - |\beta||$ from subtractor 30 and reference voltage 31 control the switching device 32. When the computed signal level exceeds the reference voltage 31 by a certain amount, the switching device 32 selects the comb filtered signal from the subtractor 24.

At the rising and falling edges, the original signal is obtained from the switching device 32. When line correlation is strong, the color carrier signal from the comb filter is sent to the output terminal 33. For this reason, more precise C separation is achieved at the output.

Further, the Y/C composite video signal via the input terminal 21 is delayed by delay device 34 and goes to the subtractor 35. The color carrier signal from the switching device 32 is subtracted from the time-adjusted Y/C composite video signal via the delay device 34 to produce the luminance signal at the output terminal 36.

As mentioned above, at the rising and falling edges, the original color carrier signal output is obtained from the switching device 32. Where line correlation is strong, the comb filter signal is obtained from the switching device 32. During strong line correlation, the color carrier component of the Y/C composite video signal input to the subtractor 35 is substantially equal to the comb filter signal from the switching device 32. Also, at the rising and falling edges, the switching device 32 output is the same as the original signal. Therefore, a more accurately separated luminance signal is obtained at the output terminal 36.

In the above embodiment, the computation used $||\alpha|-|\beta||$, however, $||\beta|-|\alpha||$ may also be used to produce the same effect. Also, the above formula can be changed to $||\alpha|-|\beta||-$MIN $(|\alpha|, |\beta|)$ and the switching device 32 control reversed, to yield the same effect as the above embodiment. To generalize, the formula i MIN $(|\alpha|, |\beta|)-j\,||\alpha|-|\beta||$, with i and j being coefficients within the range of $-1$ to $+1$ can be used. (In the formula used in the above embodiment i=j=1.) Changing these coefficients i and j is effectively equal to changing the fixed reference voltage 31, resulting in the same effect as the above embodiment. Accordingly, in determining the scope of the claims, these modifications should be construed as equivalent to the use of the computation described in the above embodiment.

Figure 11:
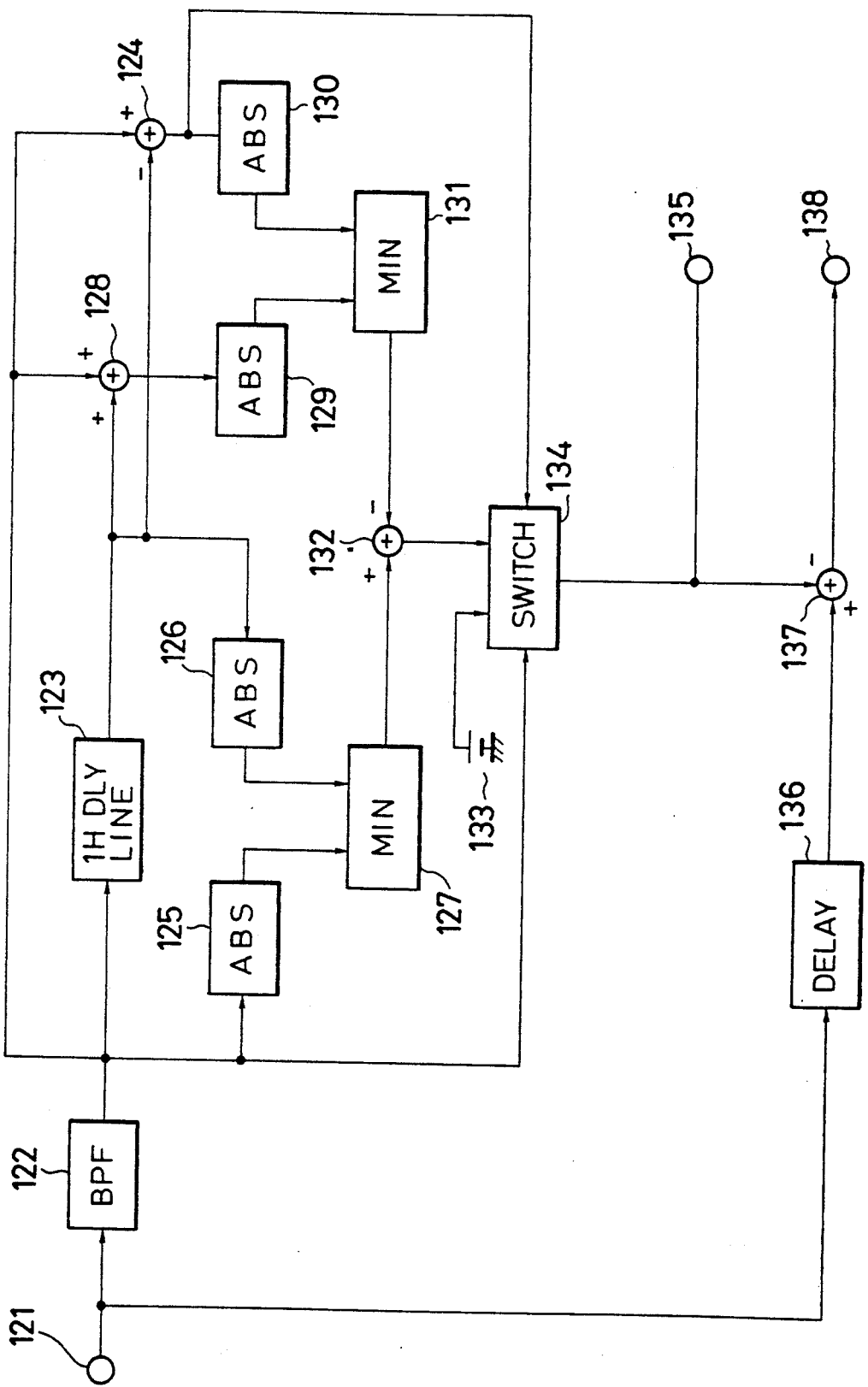
FIG. 11 illustrates a block diagram of another embodiment of the invention.

Another embodiment of the invention, shown in FIG. 11 uses, in place of the above computed signal, the computed signal from MIN $(|\alpha|, |\beta|)-$MIN $(|\alpha-\beta|, |\alpha+\beta|)$ for the selection of the non-comb filter processed signal at the rising and falling edges, or the comb filter processed signal at locations with strong line correlation.

In FIG. 11, an input terminal 121 is for input of the Y/C composite video signal input terminal, a bandpass filter 122 is for extracting only the color carrier signal band component from the Y/C composite video signal, a 1 H delay line 123 is for delaying color carrier signal band component extracted by the bandpass filter 122, a subtractor 124 is for subtracting the 1 H delayed signal from the signal extracted by the bandpass filter 122, an absolute value converter 125 is for the output signal of the bandpass filter 122, an absolute value converter 126 is for producing the absolute value of the delayed signal from the 1 H delay line 123, a minimum value selector 127 is for selecting the smaller level of the output signals of the absolute value converter 125 and 126.

An adder 128 is for adding the output of bandpass filter 122 and the output of the 1 H delay line 123. An absolute value converter 129 is for producing the absolute value of the output signal of the adder 128. An absolute value converter 130 is for producing the output signal of the subtractor 124. A minimum value selector 131 is for selecting the smaller level of the output signals of the absolute value converters 129 and 130. A subtractor 132 is for subtracting the output signal of the minimum value selector 131 from output signal of the the minimum value selector 127. A switching device 134 is controlled by the output signal of the subtractor 132 and selects either the output signal of the bandpass filter 122 or the output signal of the subtractor 124. When the control signal is higher than a fixed reference voltage 133, the subtractor 124 output signal is selected.

In addition, an output terminal 135 is for outputting the color carrier signal from switching device 134. A delay device 136 is for adjusting the timing of the Y/C composite video signal via the input terminal 121 with the timing of the color carrier signal from the switching device 134. A subtractor 137 is for subtracting the color carrier signal output by the switching device 134 from the delayed Y/C composite signal at the output of the delay device 136. An output terminal 138 is for outputting the luminance signal from the subtractor 137.

It is assumed that, as in the above description, $\alpha$ denotes the original color carrier signal and $\beta$ denotes the signal obtained by delaying the signal $\alpha$ by 1 H period, and the phase is reversed when the signal $\alpha$ is delayed by 1 H period. If line correlation is present, the levels of the signal $\alpha$ and the signal $\beta$ are substantially equal. Conversely, if line correlation is absent, when the color carrier signal waveform level or phase varies, a level difference appears between signals $\alpha$ and $\beta$. Consequently, when line correlation in the color carrier signal ceases, the $|\alpha|$ signal level and the $|\beta|$ signal level become different from each other, i.e., the one becomes appreciably smaller than the other. Conversely speaking, line correlation is present when the $|\alpha|$ and $|\beta|$ signal levels are equal.

This is illustrated in FIG. 2. In FIG. 2, the vertical axis is the signal $\beta$ level and the horizontal axis is the signal $\alpha$ level. According to the figure, on $\beta=\alpha$ axis, the level and the phase are the same. On $\beta=-\alpha$ axis, the level is the same but the phase is reversed, i.e., cross color component. On the signal $\beta$ and signal $\alpha$ level axes, fluctuations, i.e., rising and falling edge components appear. Consequently, line correlation is present only in the region of the $\beta=\alpha$ axis.

Graphic representation of MIN $(|\alpha|, |\beta|)$ is given in FIG. 3. On the signal $\beta$ and signal $\alpha$ level axes, MIN $(|\alpha|, |\beta|)=0$, which is the minimum value. On the $\beta=\alpha$ $\beta=-\alpha$ axes, MIN $(|\alpha|, |\beta|)=|\alpha|$ or $|\beta|$.

Figure 12:
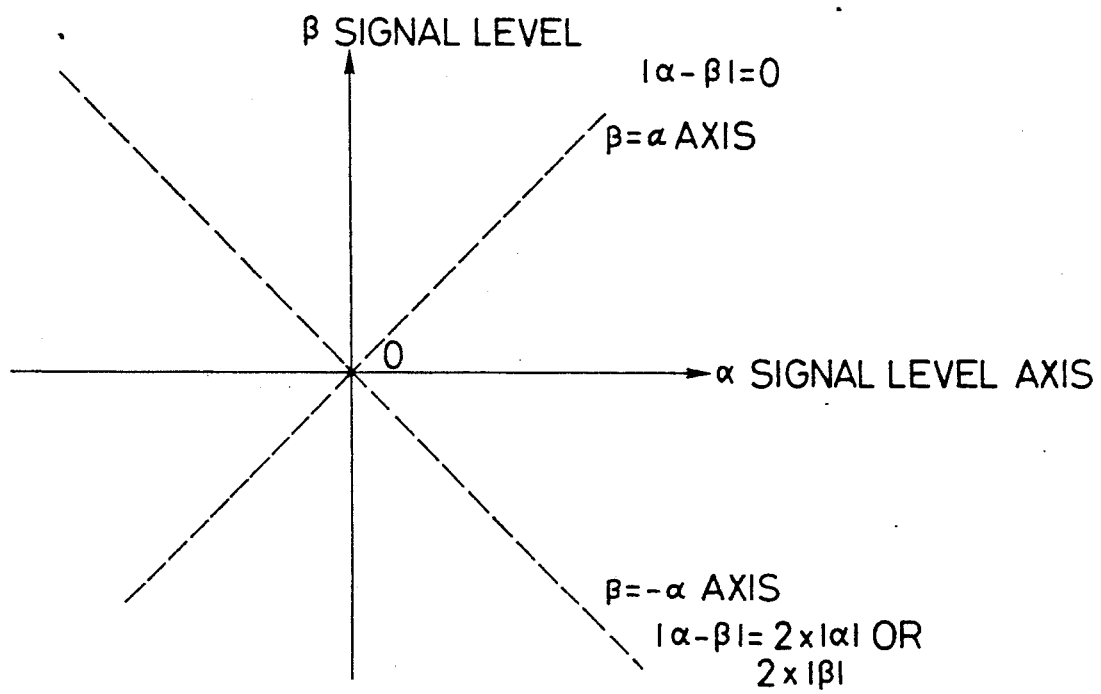
FIG. 12 illustrates the states of $|\alpha-\beta|$.

FIG. 12 illustrates $|\alpha-\beta|$. On the $\beta=\alpha$ axis, $|\alpha-\beta|=0$, which is the minimum value. On the $\beta=-\alpha$ axis, $|\alpha-\beta|=2\times|\alpha|$ or $2\times|\beta|$.

Figure 13:
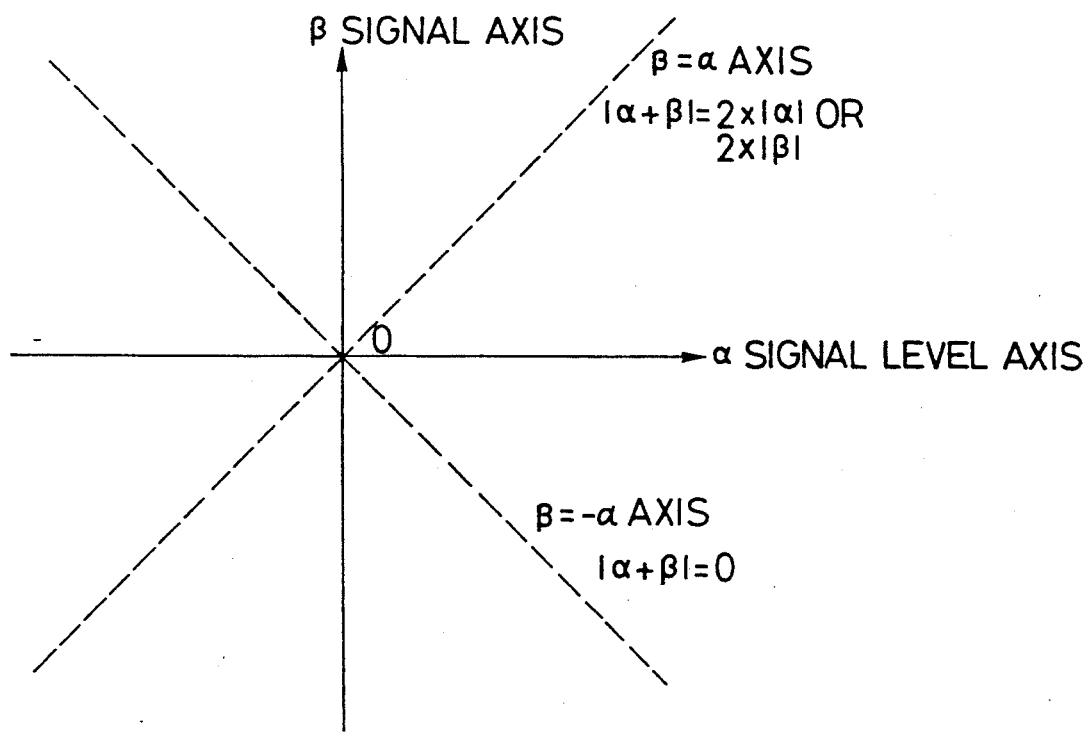
FIG. 13 illustrates the states of $|\alpha+\beta|$.

FIG. 13 illustrates $|\alpha+\beta|$. On the $\beta=-\alpha$ axis, $|\alpha+\beta|=0$, which is the minimum value. On the $\beta=\alpha$ axis, $|\alpha+\beta|=2 \times |\alpha|$ or $2 \times |\beta|$.

Figure 14:
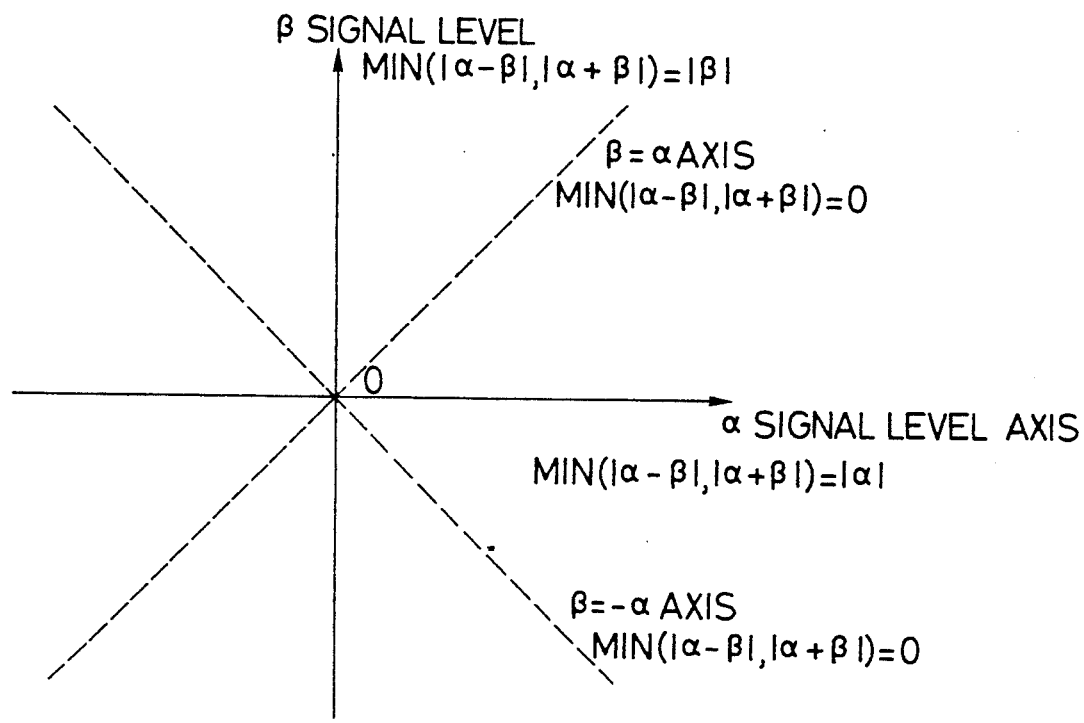
FIG. 14 illustrates the states of MIN ($|\alpha-\beta|$, $|\alpha+\beta|$).

FIG. 14 is a graphic representation of MIN ($|\alpha-\beta|$, $|\alpha+\beta|$) derived from FIG. 12 and FIG. 13. On the $\beta=\alpha$ and $\beta=-\alpha$ axes, MIN ($|\alpha-\beta|$, $|\alpha+\beta|$)=0, which is the minimum value. On the $\alpha$ axis, MIN ($|\alpha-\beta|$, $|\alpha+\beta|$)=$|\alpha|$. On the $\beta$ axis, MIN ($|\alpha-\beta|$, $|\alpha+\beta|$)=$|\beta|$.

Figure 15:
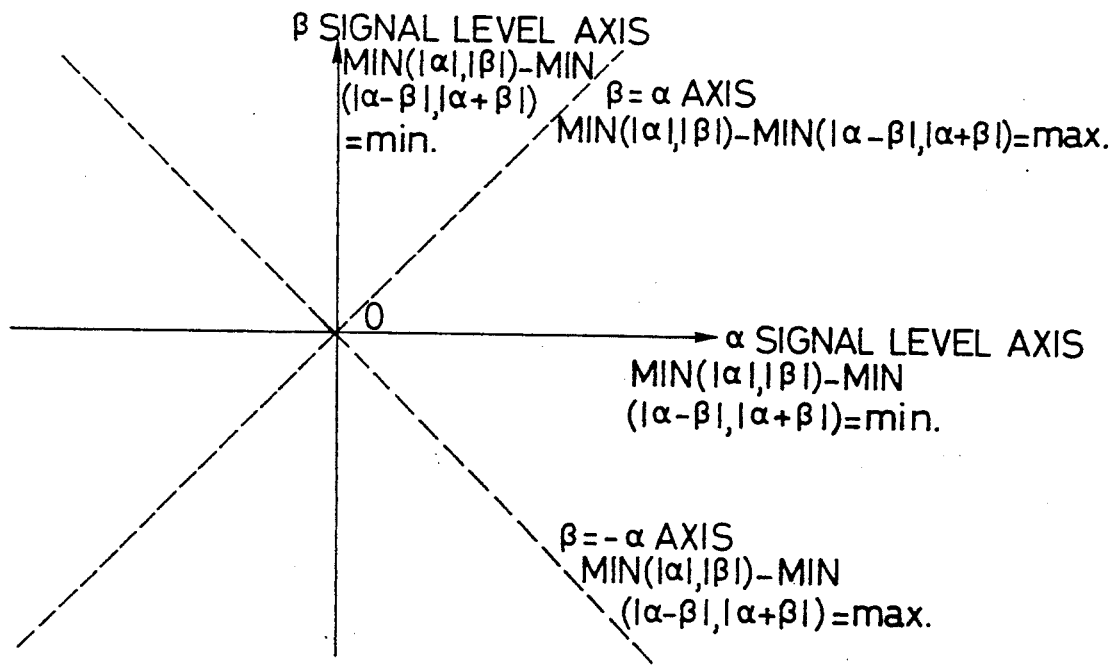
FIG. 15 illustrates the states of MIN ($|\alpha|$, $|\beta|$)$-$MIN ($|\alpha-\beta|$, $|\alpha+\beta|$).

Graphic representation of MIN ($|\alpha|$, $|\beta|$)−MIN ($|\alpha+\beta|$, $|\alpha-\beta|$) derived from the above is given in FIG. 15. According to the graph, the minimum value appears on the $\beta$ and $\alpha$ axes.

For a better understanding of the above, let us consider a circle of radius 1 centered on the origin point 0.

Figure 16:
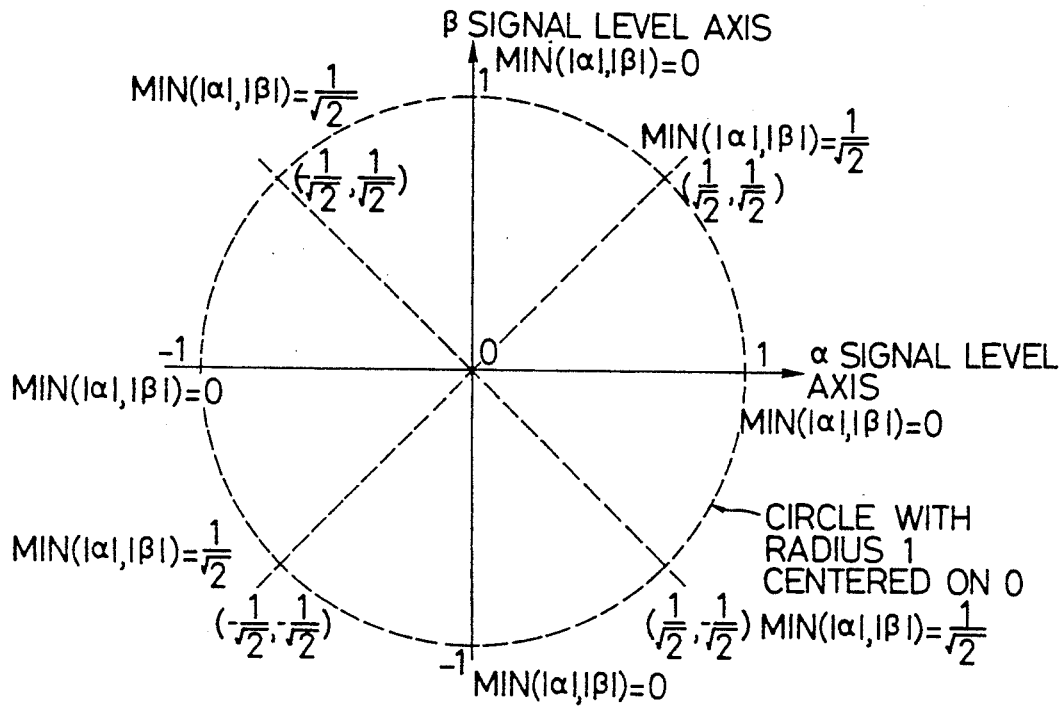
FIG. 16 illustrates the states of MIN ($|\alpha|$, $|\beta|$) using a circle with origin point 0 and radius 1.

FIG. 16 illustrates MIN ($|\alpha|$, $|\beta|$). At ($\alpha$, $\beta$)=(1, 0), (0, 1), (−1, 0) and (0, −1); MIN ($|\alpha|$, $|\beta|$)=0, which is the minimum value. At ($\alpha$, $\beta$)=($\frac{1}{2}^{\frac{1}{2}}$, $\frac{1}{2}^{\frac{1}{2}}$), ($-\frac{1}{2}^{\frac{1}{2}}$, $\frac{1}{2}^{\frac{1}{2}}$), ($-\frac{1}{2}^{\frac{1}{2}}$, $-\frac{1}{2}^{\frac{1}{2}}$) and ($\frac{1}{2}^{\frac{1}{2}}$, $-\frac{1}{2}^{\frac{1}{2}}$); MIN ($|\alpha|$, $|\beta|$)=$\frac{1}{2}^{\frac{1}{2}}$, which is the maximum value.

Figure 17:
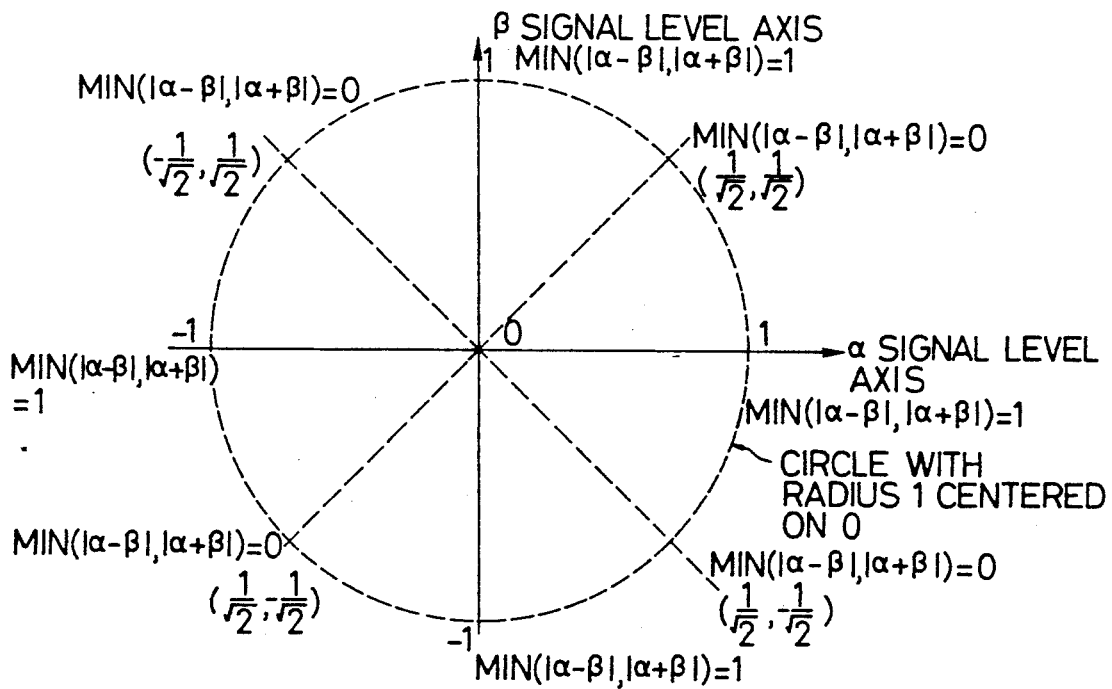
FIG. 17 illustrates the states of MIN ($|\alpha-\beta|$, $|\alpha+\beta|$) using a circle with origin point 0 and radius 1.

FIG. 17 illustrates MIN ($|\alpha-\beta|$, $|\alpha+\beta|$). At ($\alpha$, $\beta$)=($\frac{1}{2}^{\frac{1}{2}}$, $\frac{1}{2}^{\frac{1}{2}}$), ($-\frac{1}{2}^{\frac{1}{2}}$, $\frac{1}{2}^{\frac{1}{2}}$), ($-\frac{1}{2}^{\frac{1}{2}}$, $-\frac{1}{2}^{\frac{1}{2}}$) and ($\frac{1}{2}^{\frac{1}{2}}$, $-\frac{1}{2}^{\frac{1}{2}}$); MIN ($|\alpha-\beta|$, $|\alpha+\beta|$)=0, which is the minimum value. At ($\alpha$, $\beta$)=(1, 0), (0, 1), (−1, 0) and (0, −1); MIN ($|\alpha-\beta|$, $|\alpha+\beta|$)=1, which is the maximum value.

Figure 18:
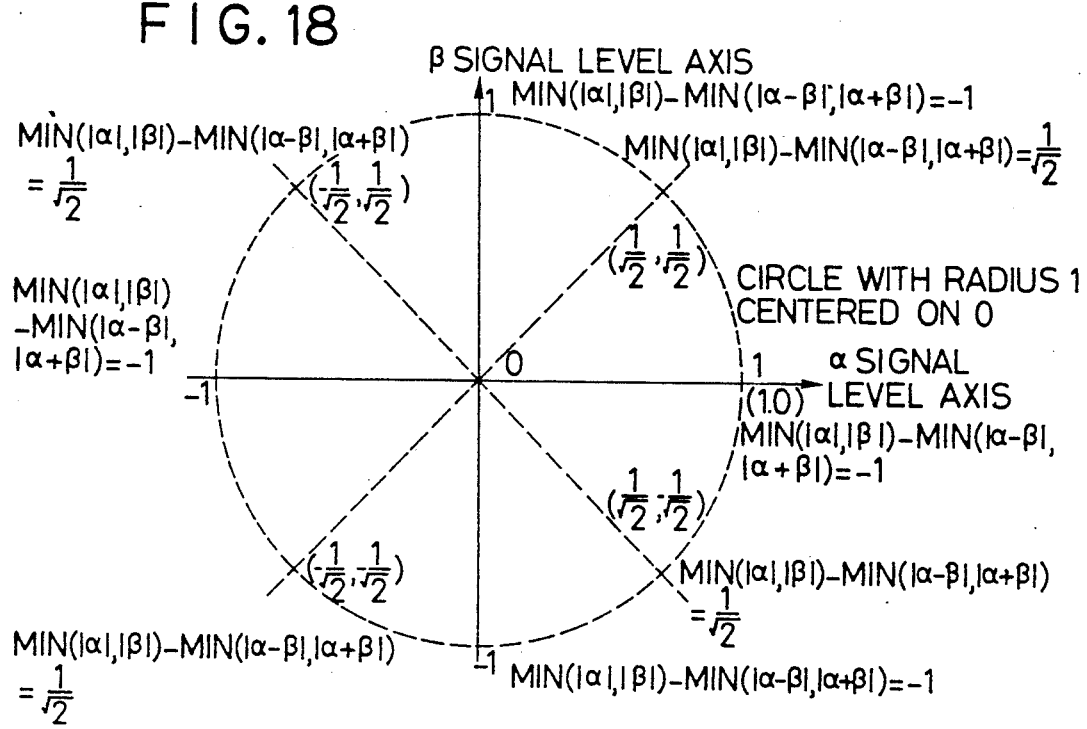
FIG. 18 illustrates the states of MIN ($|\alpha|$, $|\beta|$)$-$MIN ($|\alpha-\beta|$, $|\alpha+\beta|$) using a circle with origin point 0 and radius 1.

FIG. 18 is a graphic representation of MIN ($|\alpha|$, $|\beta|$)−MIN ($|\alpha-\beta|$, $|\alpha+\beta|$) derived from FIG. 16 and FIG. 17. At ($\alpha$, $\beta$)=(1, 0), (0, 1), (−1, 0) and (0, −1); MIN ($|\alpha|$, $|\beta|$)−MIN ($|\alpha-\beta|$, $|\alpha+\beta|$)=−1, which is the minimum value. At ($\alpha$, $\beta$)=($\frac{1}{2}^{\frac{1}{2}}$, $\frac{1}{2}^{\frac{1}{2}}$), ($-\frac{1}{2}^{\frac{1}{2}}$, $\frac{1}{2}^{\frac{1}{2}}$), ($-\frac{1}{2}^{\frac{1}{2}}$, $-\frac{1}{2}^{\frac{1}{2}}$) and ($\frac{1}{2}^{\frac{1}{2}}$, $-\frac{1}{2}^{\frac{1}{2}}$); MIN ($|\alpha|$, $|\beta|$)−MIN ($|\alpha-\beta|$, $|\alpha+\beta|$)=$\frac{1}{2}^{\frac{1}{2}}$, which is the maximum value.

Figure 19:
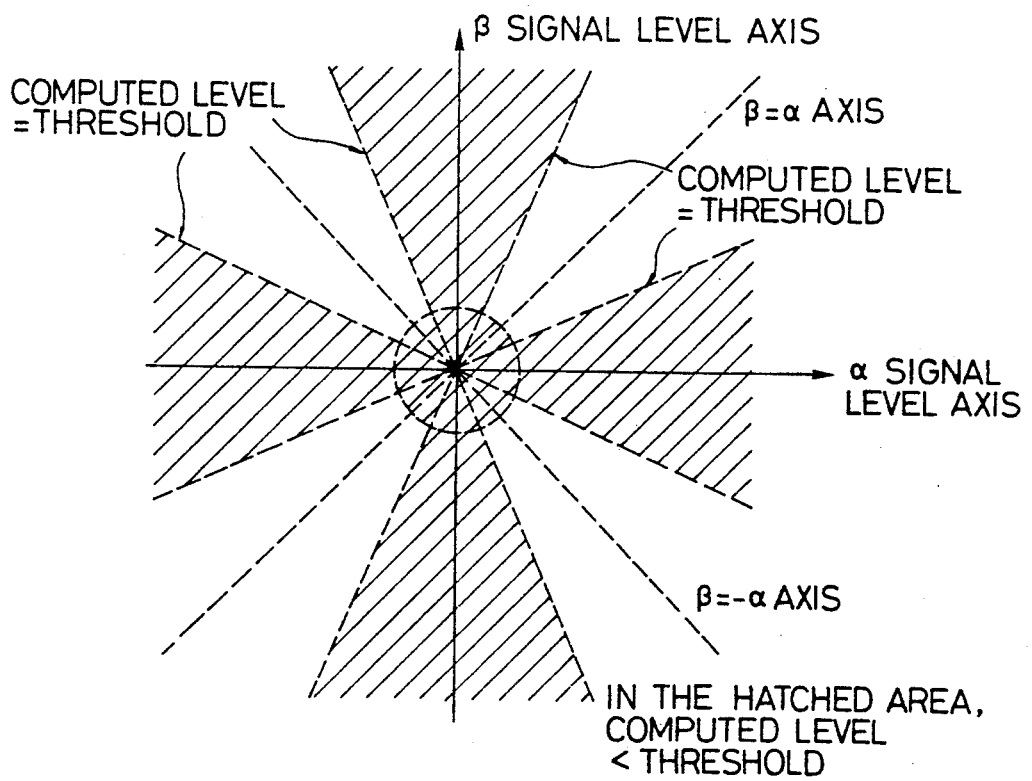
FIG. 19 illustrates detectable ranges with respect to the threshold level.

It will be understood from the above that, by comparing the signal obtained from computing MIN ($|\alpha|$, $|\beta|$)−MIN ($|\alpha-\beta|$, $|\alpha+\beta|$) with a certain threshold level (for example, voltage corresponding to a computed signal level of 0.2), the ranges near the $\beta$ and $\alpha$ axes, and those outside this region can be discriminated. This is illustrated in FIG. 19.

In again looking at FIG. 2, the color carrier signal rising and falling edges appear on the $\alpha$ and $\beta$ axes. Since line correlation is absent, error signals are produced with a conventional comb filter and as a result dot interference appears in the picture. In order to eliminate this, by using the original signal in place of the comb filter signal at the color carrier signal rising and falling edges, dot interference can be removed (or reduced) in these components.

By using the above signal computed by MIN ($|\alpha|$, $|\beta|$)−MIN ($|\alpha-\beta|$, $|\alpha+\beta|$) as the control signal, and by switching, according to this control signal, the output between the original signal and comb filter signal, the above mentioned problem can be eliminated.

Following is a description of the operation of the embodiment with reference to FIG. 11.

The bandpass filter 122 separates the color carrier signal band signal from the Y/C composite video signal via the input terminal 121. This is supplied via the 1 H delay line 123 and the subtractor 124 to the switching device 134. The 1 H delayed signal from the 1 H delay line 123 is supplied to the subtractor 124. The subtractor 124 produces chroma comb processed signal (corresponding to above $\alpha+\beta$) from the 1 H delay line 123 and the output of the bandpass filter 122 to the switching device 134. This signal level is equal to that sent from the bandpass filter 122 to the switching device 134.

Further, the signal from the bandpass filter 122 is converted into an absolute value (corresponding to above $|\alpha|$) by the absolute value converter 125 and supplied to the minimum value selector 127. Also supplied to the minimum value selector 127 is the absolute value (corresponding to $|\beta|$) of the signal from the 1 H delay line 123 via the absolute value converter 126. The lower level signal (corresponding to MIN ($|\alpha|$, $|\beta|$) is selected and supplied to the subtractor 132.

The signal from bandpass filter 122 and the 1 H delayed signal from the 1 H delay line 123 are supplied to the adder 128. The sum signal (corresponding to $\alpha+\beta$) is supplied to the absolute value converter 129. The converted signal (corresponding to $|\alpha+\beta|$) is sent to the minimum value selector 131.

The output signal of the subtractor 124 (corresponding to $\alpha-\beta$) is converted to an absolute value (corresponding to $|\alpha-\beta|$) at the absolute value converter 130 and then supplied to the minimum value selector 131. The input signal with the lower level (corresponding to MIN ($|\alpha-\beta|$, $|\alpha+\beta|$) is selected and sent to the subtractor 132. The subtractor 132 yields the required computed signal MIN ($|\alpha|$, $|\beta|$)−MIN ($|\alpha-\beta|$, $|\alpha+\beta|$), which goes to the switching device 134.

In this embodiment, the circuit examples for absolute value converters 125, 126, 129 and 130, and the minimum value selectors 127 and 131 are the same as those of FIG. 10.

The formula used in the above embodiment can be changed to MIN ($|\alpha-\beta|$, $|\alpha+\beta|$)−MIN ($|\alpha|$, $|\beta|$) and the switching device 134 control reversed, to yield the same effect as the above embodiment. To generalize, the formula i MIN ($|\alpha|$, $|\beta|$)−j MIN ($|\alpha-\beta|$, $|\alpha+\beta|$), with i and j being coefficients within the range of −1 to +1 can be used. (In the formula used in the above embodiment, i=j=1.). Changing these coefficients is effectively equal to changing the fixed reference voltage 133, resulting in the same effect as the above embodiment. Accordingly, in determining the scope of the claims, these modifications should be construed as equivalent to the use of the computation described in the above embodiment.

Figure 20:
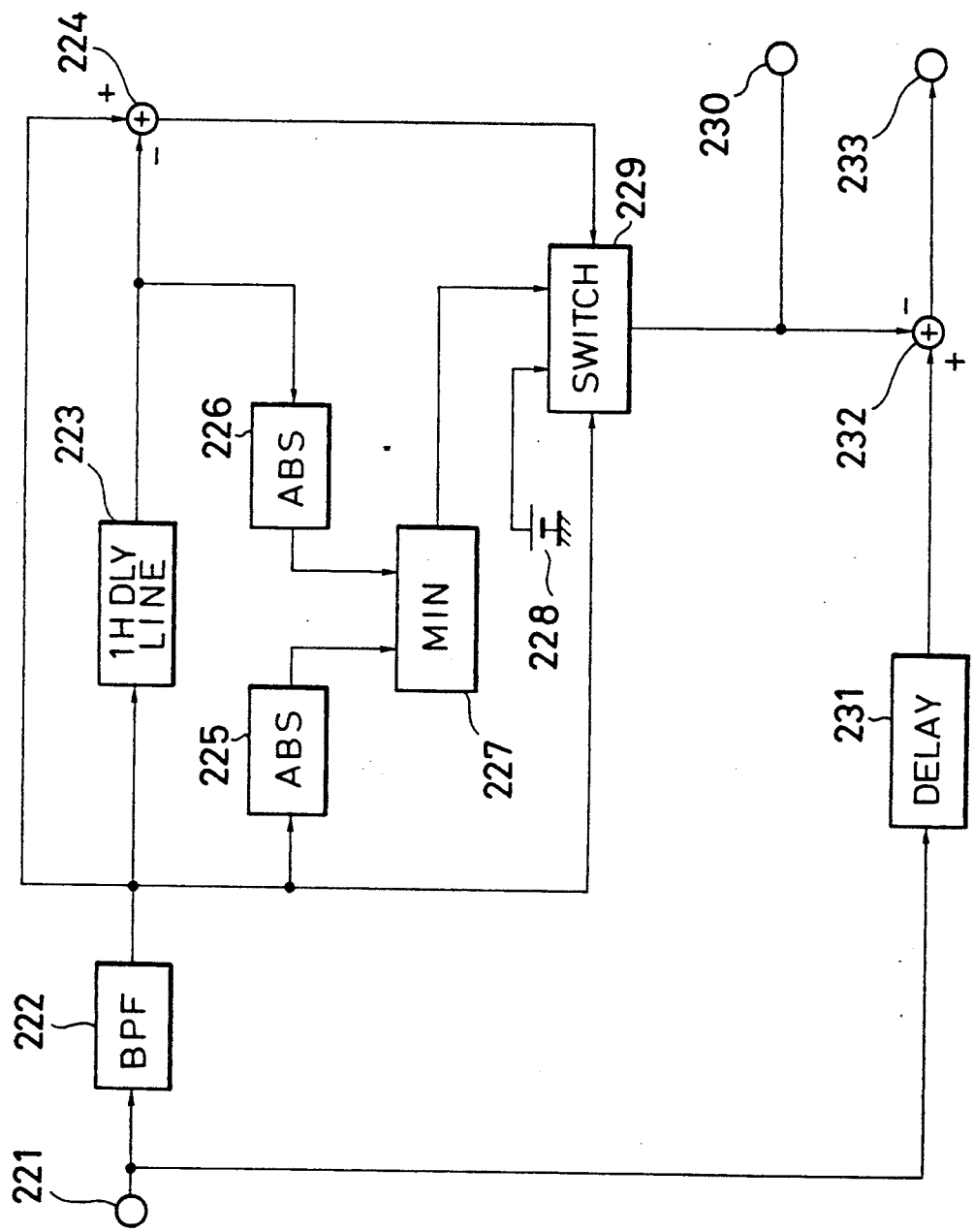
FIG. 20 is a block diagram of a Y/C separator forming a further embodiment of the invention.

A further embodiment shown in FIG. 20 uses the computed signal from MIN ($|\alpha|$, $|\beta|$) in place of the above formula and employs a switching device to select the non-comb filter processed signal at the rising and falling edges, and the comb filter processed signal at locations with strong line correlation.

In FIG. 20, an input terminal 221 is for input of the Y/C composite video signal. A bandpass filter 222 is for separating only the signal of the color carrier signal band component from the Y/C composite signal. A 1 H delay line 223 is for delaying the color carrier band signal from the bandpass filter 222. A subtractor 224 is for subtracting the delayed output signal via the 1 H delay line 223 from the output signal of the bandpass filter 222. An absolute value converter 225 is for producing an absolute value of the output signal of the bandpass filter 222. An absolute value converter 226 is for producing an absolute value of output signal of the 1 H delay line 223.

A minimum value selector 227 selects the lesser level of the signals from absolute value converters 225 and 226. A switching device 229 is controlled by the output signal of the minimum value selector 227 for selecting either the output of the bandpass filter 222 or the output of the subtractor 224. When the control signal is higher than a fixed reference voltage 228, the output signal of the subtractor 224 is selected.

An output terminal 230 is for outputting the color carrier signal selected by the switching device 229. A delay device 231 is for adjusting the timing of the Y/C composite video signal via the input terminal 221 with the timing of the color carrier signal via the switching device 229. A subtractor 232 is for subtracting the color carrier signal via the switching device 229 from the Y/C composite signal via the delay device 231. An output terminal 233 is for outputting the luminance signal from the subtractor 232.

It will be understood that line correlation is present when the $|\alpha|$ and $|\beta|$ signal levels are equal.

This principle is illustrated in FIG. 3;

FIG. 3 is a graph of MIN ($|\alpha|$, $|\beta|$). On the $\beta$ and $\alpha$ signal axes, MIN ($|\alpha|$, $|\beta|$)=0, which is the minimum value. On the $\beta=\alpha$ and $\beta=-\alpha$ axes, MIN ($|\alpha|$, $|\beta|$)=$|\alpha|$ or $|\beta|$.

For a better understanding of the above, let us consider a circle of radius 1 centered on the origin point 0.

Figure 21:
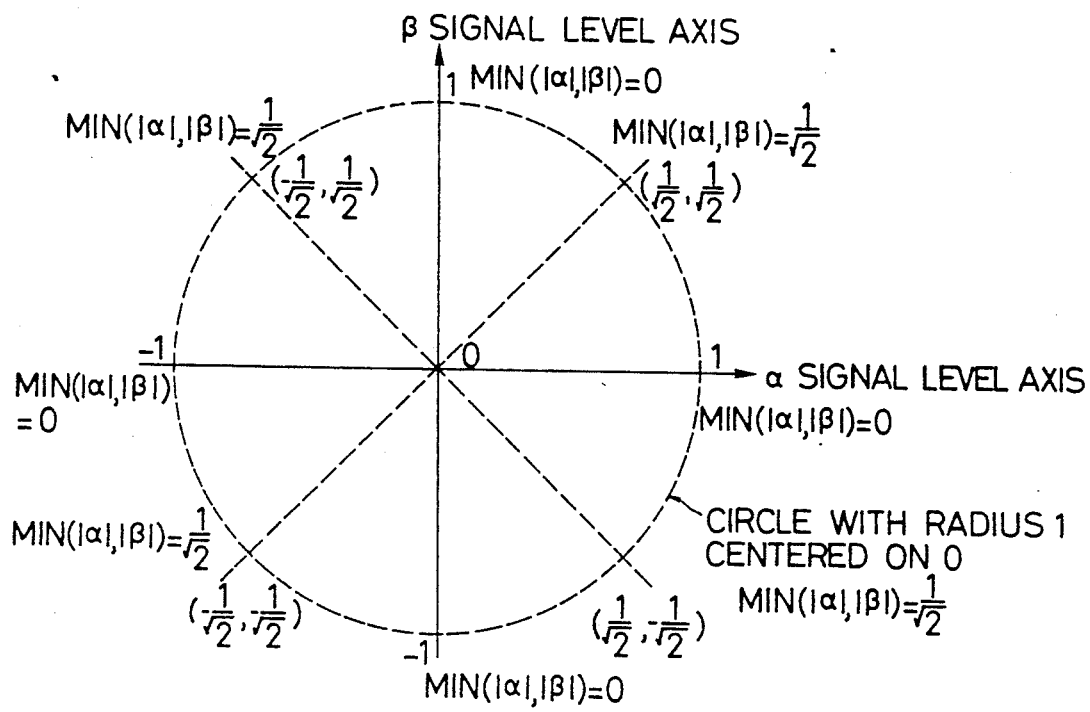
FIG. 21 illustrates the states of MIN ($|\alpha|$, $|\beta|$) using a circle with origin point 0 and radius 1.

FIG. 21 is a graph of MIN ($|\alpha|$, $|\beta|$). At ($\alpha$, $\beta$)=(1, 0), (0, 1), (−1, 0) and (0, −1); MIN ($|\alpha|$, $|\beta|$)=0, which is the minimum value. At ($\alpha$, $\beta$)=($\frac{1}{2}^{\frac{1}{2}}$, $\frac{1}{2}^{\frac{1}{2}}$), (−$\frac{1}{2}^{\frac{1}{2}}$, $\frac{1}{2}^{\frac{1}{2}}$), (−$\frac{1}{2}^{\frac{1}{2}}$, −$\frac{1}{2}^{\frac{1}{2}}$) and ($\frac{1}{2}^{\frac{1}{2}}$, −$\frac{1}{2}^{\frac{1}{2}}$); MIN ($|\alpha|$, $|\beta|$)=$\frac{1}{2}^{\frac{1}{2}}$, which is the maximum value.

Figure 22:
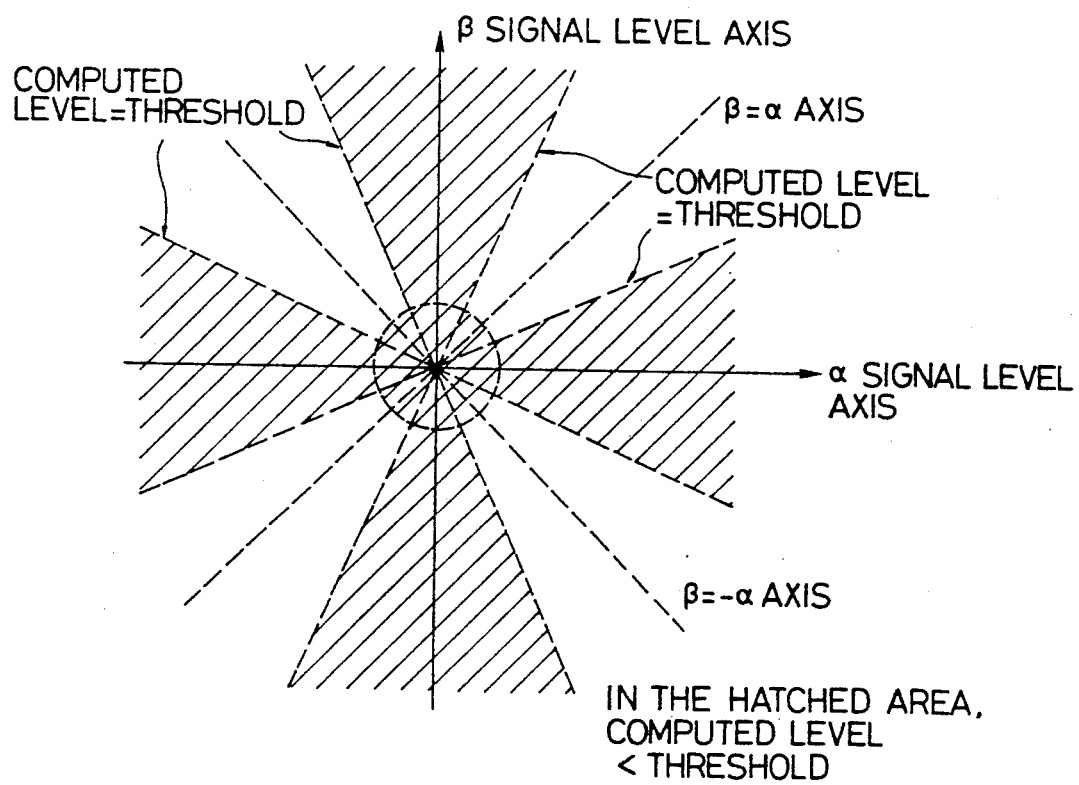
FIG. 22 illustrates detectable ranges of computed signal and threshold level.

It will be understood that, by comparing the signal obtained from computing MIN ($|\alpha|$, $|\beta|$) with a certain threshold level (for example, voltage corresponding to a computed signal level of 0.2), the ranges near the $\beta$ and $\alpha$ axes, and those outside this region can be discriminated. This is illustrated in FIG. 22.

In again looking at FIG. 2, the color carrier signal rising and falling edges appear on the $\alpha$ and $\beta$ axes. Since line correlation is absent, error signals are produced with the conventional comb filter and as a result dot interference appears in the picture. In order to eliminate this, in place of the comb filter signal, the original signal is used at the color carrier signal rising and falling edges, and dot interference can thereby be removed (or reduced).

By using the above signal computed by MIN ($|\alpha|$, $|\beta|$) as the control signal, and by switching, in accordance with this control signal, the output between the original signal and comb filter signal, the above mentioned problem can be eliminated.

Following is a description of the operation of the above embodiment with reference to FIG. 20.

The bandpass filter 222 separates the color carrier band signal from the Y/C composite video signal via the input terminal 221. This is supplied to the 1 H delay line 223, the subtractor 224 and the switching device 229. The switching device 229 selects between the signal from the bandpass filter 222 or the signal from the 1 H delay line 223 and the chroma comb filter processed signal from the subtractor 224. The signal level is the same as that supplied to the switching device 229 from the bandpass filter 222.

The absolute value converter 225 converts the signal from the bandpass filter 222 into an absolute value (corresponding to $|\alpha|$), which goes to the minimum value selector 227. Also supplied to the minimum value selector 227 is the absolute value (corresponding to ($|\beta|$) of the signal through the 1 H delay line 223 and the absolute value converter 226. The lesser level (corresponding to MIN ($|\alpha|$, $|\beta|$) of these signals is selected and sent to the switching device 229.

In this embodiment, the absolute value converters 225 and 226, and the minimum value selector 227 illustrated in FIG. 10 can be used.

The computed signal MIN ($|\alpha|$, $|\beta|$) from the minimum value selector 227 and the fixed reference voltage 228 control the switching device 229. When the computed signal level exceeds the reference voltage 228 by a certain degree, the switching device 229 selects the comb filtered signal from the subtractor 224. The switching device 229 selects the original signal at the rising and falling edges. In locations where line correlation is strong, the comb filtered color carrier signal is selected and sent to the output terminal 230. For this reason, more precise C separation is produced in the output.

Further, the delay device 231 adjusts the timing of the Y/C composite video signal via the input terminal 221 with the timing of the color carrier signal via the switching device 229. The subtractor 232 subtracts the color carrier signal via the switching device 229 from the Y/C composite signal via the delay device 231. The resulting luminance signal goes to the output terminal 233.

In the above manner, the switching device 229 yields the original color carrier signal at the rising and falling edges, and the comb filtered signal where line correlation is strong. When line correlation is strong, the color carrier component of the Y/C composite video signal input at the subtractor 232 is substantially equal to the comb filtered signal from the switching device 229. Also, at the rising and falling edges, it is the same as the original signal output from the switching device 229. Therefore, more accurate Y separation is also obtained at the luminance signal output 233.

The formula used in the above embodiment can be changed to −MIN ($|\alpha|$, $|\beta|$) and the control over the switching device 229 reversed, to yield the same effect as the above embodiment. To generalize, the formula i MIN ($|\alpha|$, $|\beta|$), with i being a coefficient within the range of −1 to +1, can be used. (In the above embodiment, i=1.) Changing this coefficient is effectively the same as changing the reference voltage 228 and would yield the same results as the embodiment. Accordingly, in determining the scope of the claims, these modifications should be construed as equivalent to the use of the computation described in the above embodiment.

Figure 23:
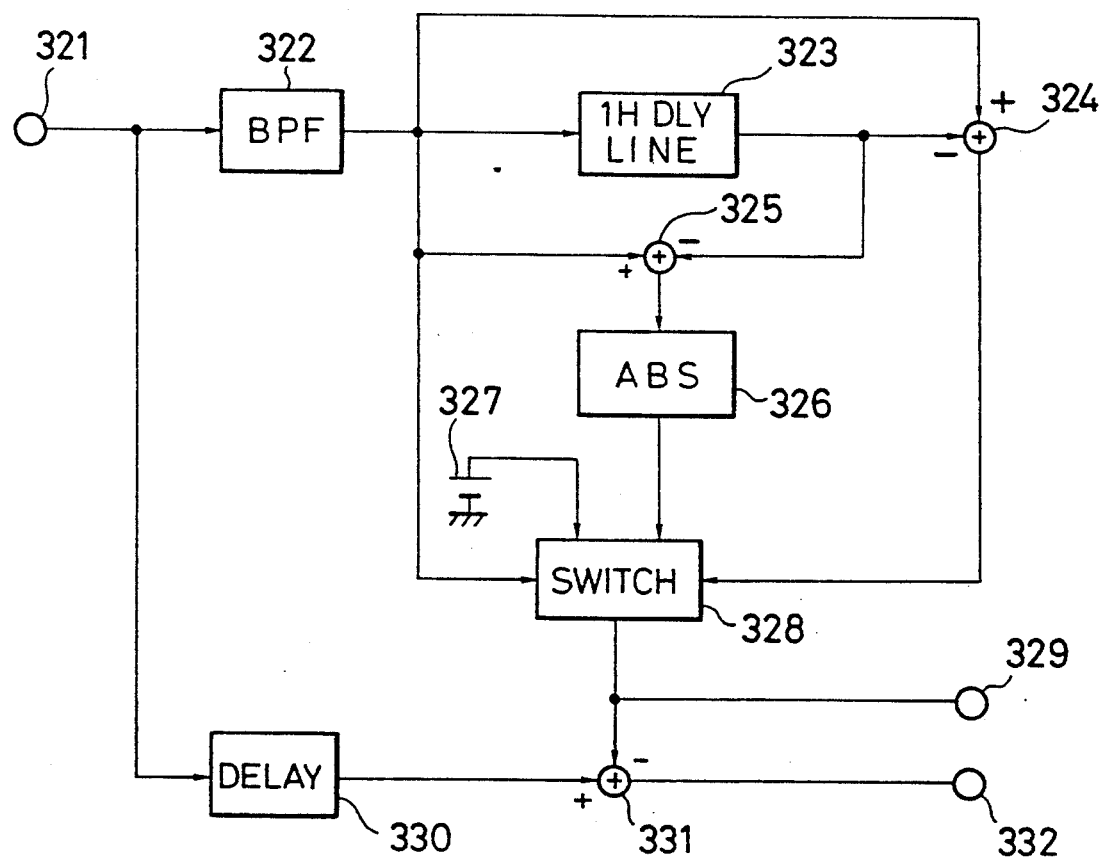
FIG. 23 is a block diagram of a Y/C separator forming a further embodiment of this invention.

A further embodiment shown in FIG. 23 uses the computed signal of $|\alpha-\beta|$ in place of the above formula, and employs the switching device to select the non-comb filtered signal at the rising and falling edges, and the comb filtered signal at strong line correlation.

In FIG. 23, an input terminal 321 is for input of the Y/C composite video signal, and a bandpass filter 322 is for extracting the color carrier signal band component from the Y/C composite video signal. A 1 H delay line 323 delays the signal from the bandpass filter 32. A subtractor 324 is for subtracting the signal via the delay line 323 from the signal via the bandpass filter 322.

A subtractor 325 is for subtracting the output signal of the 1 H delay line 323 from the output signal of the bandpass filter 322. An absolute value converter 326 is for producing an absolute value of the output signal of the subtractor 325. A switching device 328 is controlled by the output signal of the absolute value converter 326 and selects between the output signals of the bandpass filter 322 and the subtractor 324. When the control signal is lower than a fixed reference voltage 327, the output signal of the subtractor 324 is selected. An output terminal 329 is for the color carrier signal output by the switching device 328.

A delay device 330 is for adjusting the timing of the Y/C composite video signal via the input terminal 321 with the timing of the color carrier signal from the switching device 328. A subtractor 331 is for subtracting the color carrier signal via the switching device 328 from the Y/C composite video signal via the delay device 330. The resulting luminance signal goes to the output terminal 332.

As mentioned above, it will be understood that line correlation is present when the $|\alpha|$ and $|\beta|$ signal levels are equal.

Figure 24:
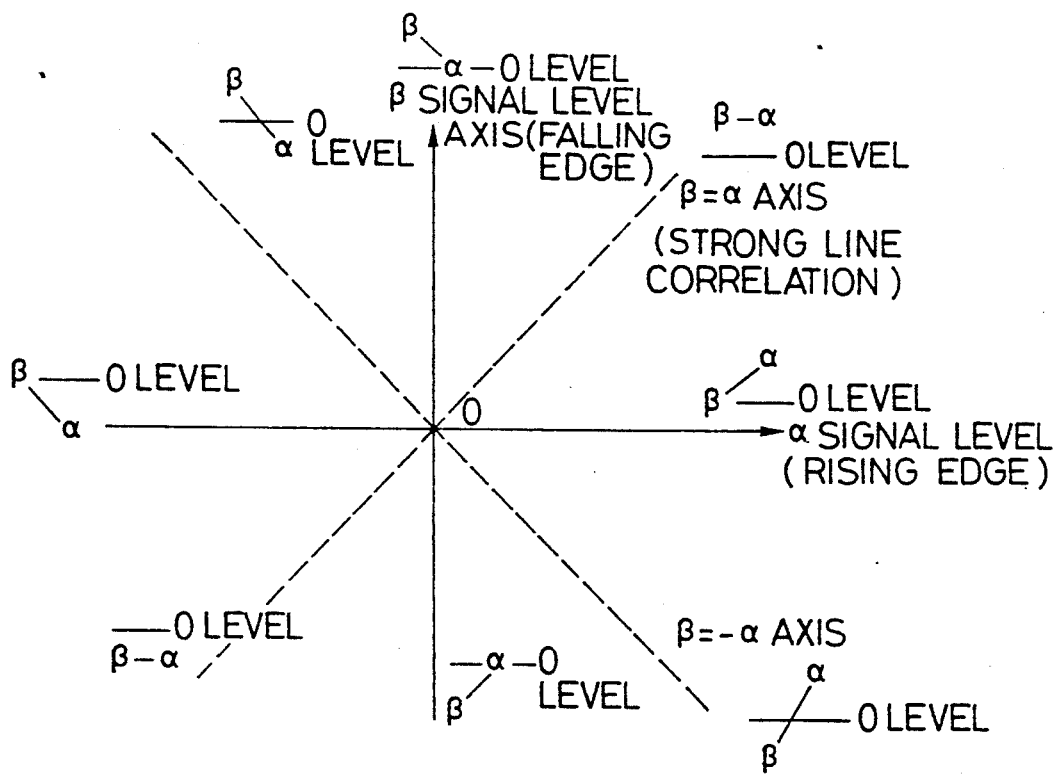
FIG. 24 illustrates the states of the $\alpha$ and $\beta$ signal levels.

This principle is illustrated in FIG. 24. In FIG. 24, the vertical axis is the $\beta$ signal level and the horizontal axis is the $\beta$ signal level. According to the figure, at the $\beta=\alpha$ axis, the level and the phase are the same, at the $\beta=-\alpha$ axis, the level is the same but the phase is reversed, resulting in a cross color component. Fluctuation, i.e., at the rising and falling edge components appear on the signal $\beta$ and signal $\alpha$ level axes. Consequently line correlation is present only in the region of the $\beta=\alpha$ axis.

Figure 25:
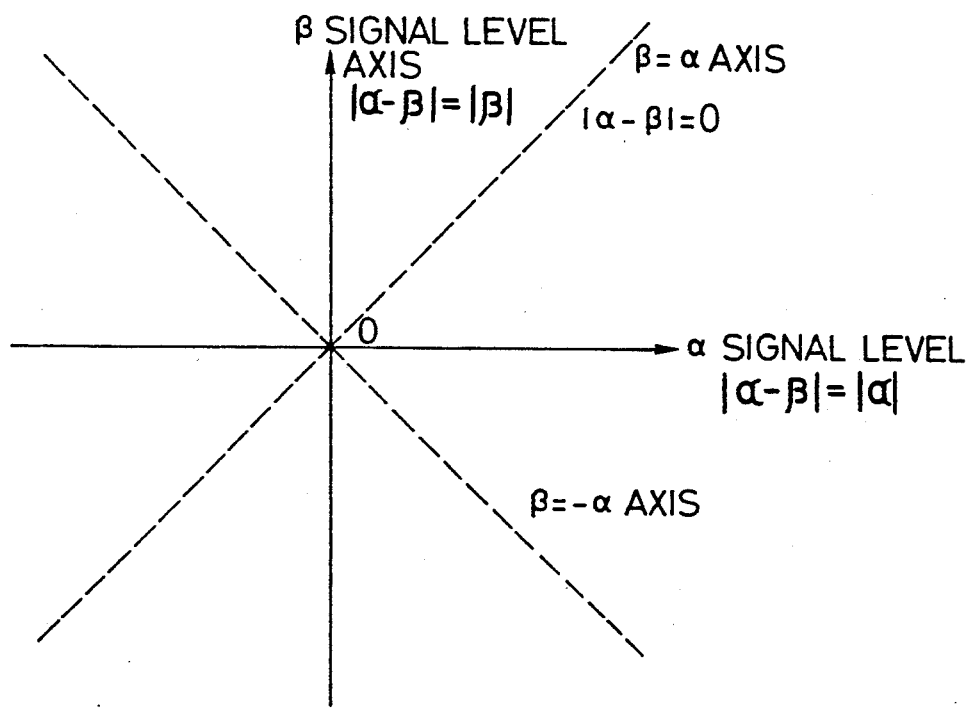
FIG. 25 illustrates the states of $|\alpha-\beta|$.

FIG. 25 illustrates a graph of $|\alpha-\beta|$. On $\beta=\alpha$ axis, $|\alpha-\beta|=0$, which is the minimum value. On the $\beta$ axis, $|\alpha-\beta|=|\beta|$ and on the $\alpha$ axis, $|\alpha-\beta|=|\alpha|$. On $\beta=-\alpha$ axis, $|\alpha-\beta|=2|\alpha|=2|\beta|$, which is the maximum value.

For a better understanding of the above, let us consider a circle of radius 1 centered on the origin point 0.

Figure 26:
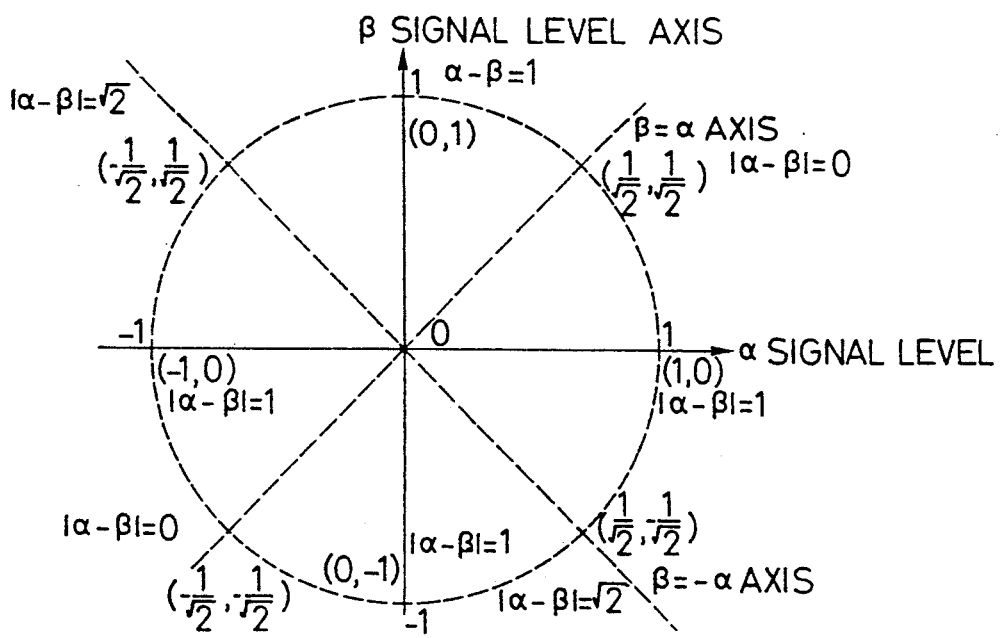
FIG. 26 illustrates the states of $|\alpha-\beta|$ using a circle with origin point 0 and radius 1.

FIG. 26 is a graph of $|\alpha-\beta|$. At $(\alpha, \beta)=(\frac{1}{2}^{\frac{1}{2}}, \frac{1}{2}^{\frac{1}{2}})$ and $(-\frac{1}{2}^{\frac{1}{2}}, -\frac{1}{2}^{\frac{1}{2}})$; $|\alpha-\beta|=0$, which is the minimum value. At $(\alpha, \beta)=(-\frac{1}{2}^{\frac{1}{2}}, \frac{1}{2}^{\frac{1}{2}})$ and $(\frac{1}{2}^{\frac{1}{2}}, -\frac{1}{2}^{\frac{1}{2}})$; $|\alpha-\beta|=\frac{1}{2}^{\frac{1}{2}}$, which is the maximum value.

Figure 27:
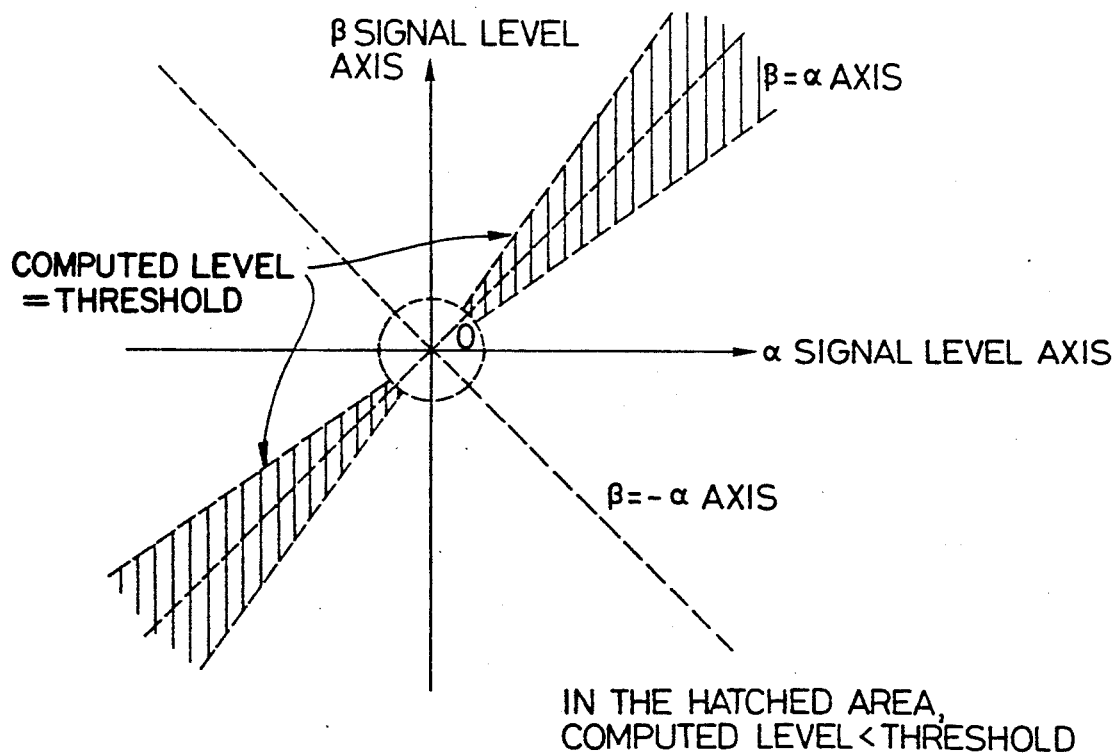
FIG. 27 illustrates detectable ranges of computed signal and threshold level.

It will be understood that by comparing the signal obtained from computing $|\alpha-\beta|$ with a certain threshold level (for example, voltage corresponding to a computed signal level of 0.2), the ranges near the $\beta=\alpha$ axis, and those outside this region can be discriminated. This is illustrated in FIG. 27.

In again looking at FIG. 24, the color carrier signal rising and falling edges appear on the $\alpha$ and $\beta$ axes. Since line correlation is absent, error signals are produced with a conventional comb filter and dot interference appears in the picture. Therefore, in place of the comb filtered signal, the original signal is used at the color carrier signal rising and falling edges, and dot interference can thereby be removed (or reduced) in these components.

By using the above signal computed by $|\alpha-\beta|$ as the control signal, and using this control signal for switching the output between the original signal and comb filtered signal, the above mentioned problem can be eliminated.

Following is a description of the operation of this embodiment with reference to FIG. 23.

The bandpass filter 322 separates the color carrier signal band from the Y/C composite video signal via the input terminal 321. This goes via the 1 H delay line 323 and the subtractor 324 to the switching device 328. The subtractor 324 supplies the chroma comb filter processed signal to the switching device 328. This signal level is equal to that supplied from the bandpass filter 322 to the switching device 328.

Further, the color carrier band signal from the bandpass filter 322 and the 1 H delayed signal are supplied to the subtractor 325. The absolute value converter 326 converts the output of the subtractor 325 into an absolute value (above $|\alpha-\beta|$), which goes to the switching device 328.

Figure 28:
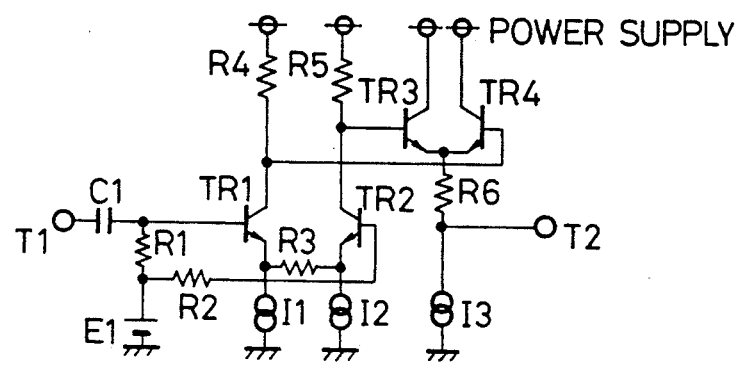
FIG. 28 shows an example of circuit for the absolute value converter.

FIG. 28 illustrates a circuit example for the absolute value converter.

In the figure, TR1-TR4 are NPN transistors, R1-R6 are resistors, I1-I3 are constant current sources, E1 is a constant DC bias voltage, C1 is a coupling capacitor, T1 is the input terminal and T2 is the output terminal.

The input signal via input terminal T1 is amplified with a required gain by the differential amplifier comprised of the transistors TR1 and TR2 (the gain is taken as 0 dB in this example). An identical-phase signal is produced with respect to the input signal via the resistor R5, while a reverse phase signal is produced with respect to the input signal via the resistor R4.

The signals are supplied to the bases of the transistors TR3 and TR4. Since the emitters of the transistors TR3 and TR4 are connected, when the voltage between the bases rises above Vbe (approximately 0.7 V (d.c.)), the transistor with the higher base potential conducts, while the transistor with the lower base potential is cutoff. Consequently, the absolute value of the signal at the input terminal T1 is obtained at the emitters of the transistors TR3 and TR4. This absolute value signal goes to the output terminal T2.

The switching device 328 is controlled by the computed signal $|\alpha-\beta|$ from absolute value converter 326 and the fixed reference voltage 327. When the computed signal level declines a certain amount below the reference voltage 327, the switching device 328 selects only the chroma comb filtered signal from subtractor 324. The switching device 328 selects the original signal at the rising and falling edges, and the comb filtered color carrier signal when line correlation is strong. Therefore, more precise C separation is obtained at the output 329.

Further, the delay device 330 adjusts the timing the Y/C composite video signal via the input terminal 321 with the timing of the color carrier signal via the switching device 328. The subtractor 331 subtracts the color carrier signal via the switching device 328 from the Y/C composite signal via delay device 330. The resulting luminance signal goes to the output terminal 332.

As described above, the switching device 328 yields the original color carrier signal at the rising and falling edges, and the comb filtered signal where line correlation is strong. When line correlation is strong, the color carrier component of the Y/C composite video signal input at the subtractor 331 is substantially equal to the comb filtered signal from the switching device 328. Also, at the rising and falling edges, it is the same as the original signal output from the switching device 328. Therefore, more accurate Y separation is also obtained at the luminance signal output 332.

The formula used in the above embodiment can be changed to $-|\alpha-\beta|$ and the control over the switching device 328 reversed to yield the same effect. To generalize, the formula i $|\alpha-\beta|$, with i being a coefficient within the range of −1 to +1, can be used. (In the above example, i=1.) Changing this coefficient is effectively the same as changing the reference voltage 327 and would yield the same results as the embodiment. Accordingly, in determining the scope of the claims, these modifications should be construed as equivalent to the use of the computation described in the above embodiment.

Further embodiments shown in FIG. 1A, FIG. 11A, FIG. 20A and FIG. 23A uses a variable mixer (32A, 134A, 229A, 328A) in place of the switching device (32, 134, 229, 328). The variable mixer is used to change the mixing ratio between the original color carrier signal and the comb filtered signal. This control is made in accordance with the computed signal.

Figure 1A:
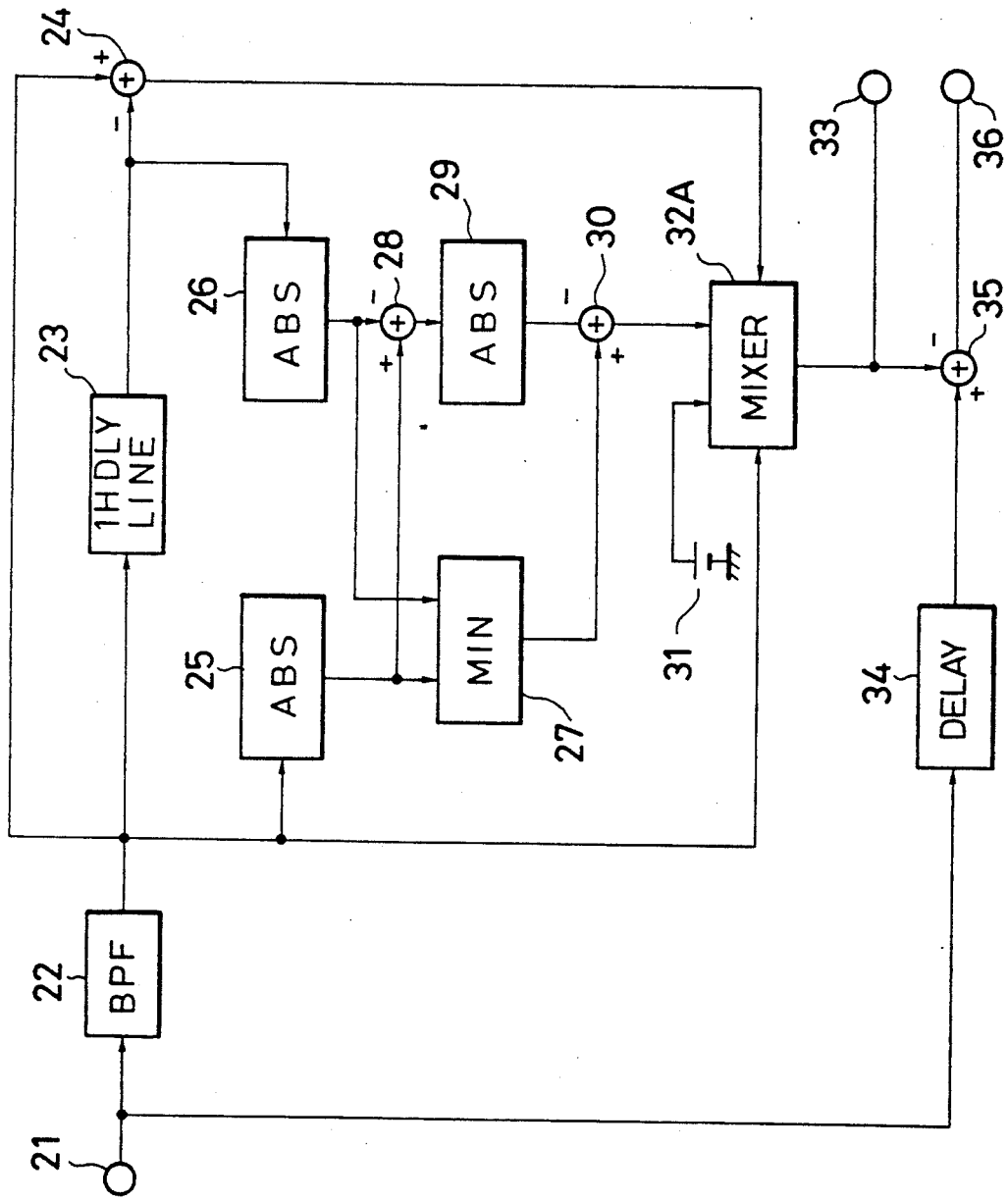
FIG. 1A is a block diagram of a modification of the embodiment of FIG. 1.

In the embodiment of FIG. 1A, the variable mixer 32A is used to change the mixing ratio between the original color carrier signal controlled by the computed signal MIN ($|\alpha|$, $|\beta|$)−$||\alpha|-|\beta||$ and the reference voltage, and the comb filter processed signal to perform C separation in addition to using this separated C signal to perform Y separation. It has a configuration shown in FIG. 1A which is identical to that shown in FIG. 1 except that a variable mixer 32A is used in place of the switching device 32.

In again looking at FIG. 2, the color carrier signal rising and falling edges appear on the $\alpha$ and $\beta$ axes. Since line correlation is absent, error signals are produced with a conventional comb filter and dot interference appears in the picture. By using the original signal in place of the comb filter signal at the color carrier signal rising and falling edges, as in the embodiment of FIG. 1, dot interference can be removed (or reduced) in these components.

Another approach, adopted by the embodiment of FIG. 1A, is to use the signal computed by the above MIN ($|\alpha|$, $|\beta|$)−$||\alpha|-|\beta||$ as the control signal for changing the mixing ratio between the original and comb filtered signals. With this approach, the above problem can also be improved.

Following is a description of the operation of this embodiment with reference to FIG. 1A.

The bandpass filter 22 separates the signal of the color carrier signal band from the Y/C composite video signal via the input terminal 21. This goes through the 1 H delay line 23 and the subtractor 24. The output of the subtractor 24 is a chroma comb filter processed signal, which is sent to the variable mixer 32A.

Further, the signal from the bandpass filter 22 is converted into an absolute value (corresponding to above $|\alpha|$) by the absolute value converter 25 and sent to the minimum value selector 27. Also supplied to the minimum value selector 27 is the absolute value (corresponding to above $|\beta|$) of the output signal of the 1 H delay line 23 via the absolute value converter 26. The smaller level of these signals (corresponding to MIN ($|\alpha|$, $|\beta|$)) is selected and supplied to the subtractor 30.

The output signal of the absolute value converter 25 (corresponding to above $|\alpha|$) and the output signal of the absolute value converter 26 (corresponding to above $|\beta|$) are supplied to the subtractor 28, which yields the difference signal (corresponding to $|\alpha|-|\beta|$), which goes to the absolute value converter 29.

The absolute value signal (corresponding to $||\alpha|-|\beta||$ is supplied to the subtractor 30, which produces the required computed signal MIN ($|\alpha|$, $|\beta|$)−$||\alpha|-|\beta||$ sent to the variable mixer 32A.

In this embodiment of the invention as well, the absolute value converters 25, 26 and 29, and the minimum value selector 27 illustrated in FIG. 10 can be used.

Figure 29:
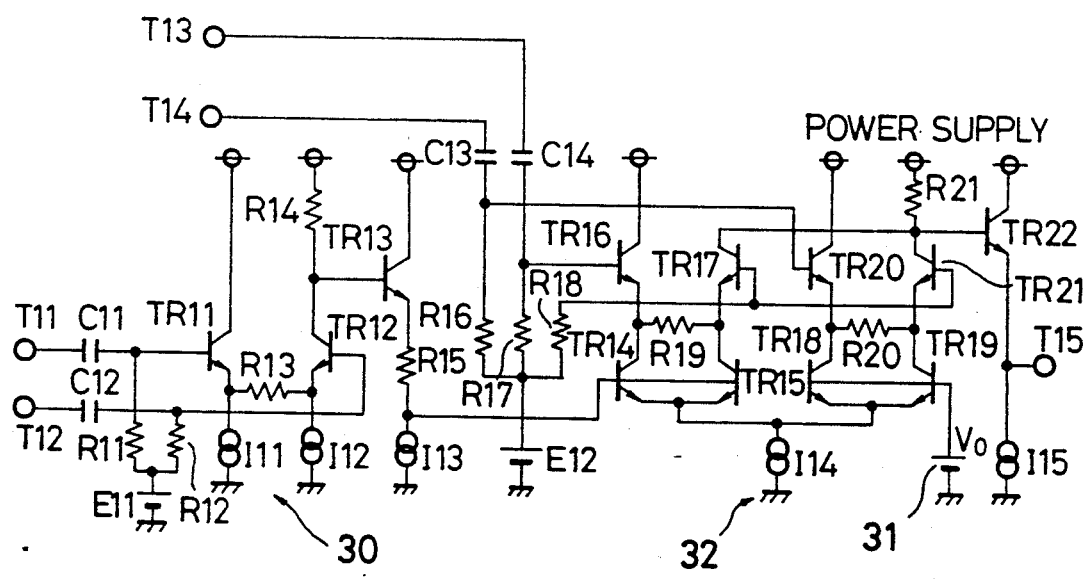
FIG. 29 illustrates a circuit that includes a subtractor, fixed reference voltage and variable mixer.

FIG. 29 illustrates a circuit example of the subtractor 30, the fixed reference voltage 31 and the variable mixer 32A which can be used in this embodiment of the invention.

In the figure, TR11–TR22 are NPN transistors, R11–R21 are resistors, I11–I15 are constant current sources, E11 and E12 are constant DC bias voltages, C11–C14 are coupling capacitors, T11–T14 are input terminals, and T15 is an output terminal.

The signal MIN ($|\alpha|$, $|\beta|$) input to the input terminal T11 is supplied to the base of the transistor TR11. The signal $||\alpha|-|\beta||$ input to the input to the input terminal T12 is supplied to the base of the transistor TR12. The transistors TR11 and TR12 compose a differential amplifier to produce a difference (amplified with a gain, which is assumed to be 0 dB), MIN ($|\alpha|$, $|\beta|$)−$||\alpha|-|\beta||$, and appears at the emitter of the transistor TR13. This signal is shifted by the resistor R15 and is supplied to the bases of the transistors TR14 and TR15.

The comb filtered signal input at the input terminal T13 is supplied to the base of the transistor TR16. The original signal that is the output of the bandpass filter 22 and input at the input terminal T14 is supplied to the base of the transistor TR20. The fixed reference voltage 31 is supplied to the bases of the transistors TR18 and TR19.

The transistors TR14–TR21 compose the variable mixer 32A. Of these, the transistors TR16 and TR17, and the transistors TR20 and TR21 comprise two non-inverting amplifiers. The transistors TR14 and TR15, and the transistors TR18 and TR19 control currents through amplifiers that are connected to the their collectors, thereby to control the gain of the amplifiers. The emitters of the transistors TR14, TR15, TR18 and TR19 are connected to the constant current source I14. The sum of the currents flowing through the transistors I0 is fixed.

The bases of the transistors TR14 and TR15 are connected to each other, and the bases of the transistors TR18 and TR19 are connected to each other. Thus, equal currents flow in the transistors TR14 and TR15, and in the transistors TR18 and TR19.

Figure 30:
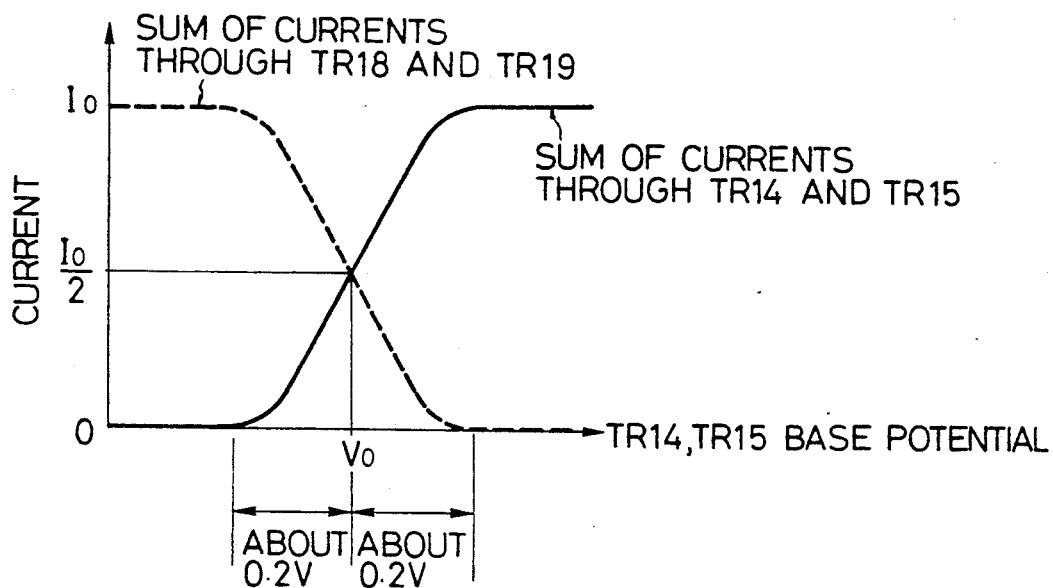
FIG. 30 illustrates the relationship of TR14 and TR15 saturation current, and TR18 and TR19 saturation current with respect to fixed reference voltage V0 applied to TR14 and TR15 bases.

FIG. 30 illustrates the relationship between the sum of the currents through the transistors TR14 and TR15, and the sum of the currents through the transistors TR18 and TR19 with respect to the base voltages of the transistors TR14 and TR15, with the reference voltage 31 (V0) fixed.

According to this, when the computed signal MIN ($|\alpha|$, $|\beta|$)−$||\alpha|-|\beta||$ supplied to the bases of the transistors TR14 and TR15 declines by more than about 0.2 V, below the reference voltage 31 (V0), the current from the constant current source goes completely to the transistors TR18 and TR19. Thus, the amplifier consisting of the transistors TR16 and TR17 ceases to function and the variable mixer 32A amplifies only the original signal input at the base of the transistor TR20 with a predetermined gain (taken here as 0 dB). The amplified signal goes to the output terminal T15.

When the computed signal exceeds the reference voltage 31 by more than about 0.2 V, the opposite of the above occurs. Only the comb filtered signal input at base of the transistor TR16 is amplified to with a predetermined gain (taken here as 0 dB), and sent to the output terminal T15.

When the computed signal equals the reference voltage 31 (V0), both of the non-inverting amplifiers of the variable mixer 32A function and the original and comb filtered signals are combined with the mixing ratio of 1:1, and the combined appear at the output terminal T15.

In this manner, at the rising and falling edges, the original signal is obtained from the output of the variable mixer 32A. Where line correlation is strong, the comb filtered color carrier signal is sent to output terminal 33. Therefore, more precise C separation is obtained at the output.

Further, the Y/C composite video signal via the input terminal 21 is time-adjusted by the delay device 34 and is supplied to the subtractor 35, which subtracts the color carrier signal output by the variable mixer 32A from the time-adjusted Y/C composite video signal via the delay device 34 to produce the luminance signal output at the output terminal 36.

As mentioned above, at the rising and falling edges, the original color carrier signal output is output from the variable mixer 32A. Where line correlation is strong, the comb filter signal output is output. When line correlation is strong, the color carrier component of the Y/C composite video signal via the subtractor 35 is substantially equal to the comb filter signal from the mixer. Also, at the rising and falling edges, the mixer output is the same as the original signal. Therefore, a more accurately separated luminance signal is obtained at the output terminal 36.

In the above embodiment, the computation used $||\alpha|-|\beta||$. But $||\beta|-|\alpha||$ may also be used to produce the same effect. Also, the above formula can be changed to $||\alpha|-|\beta||-\text{MIN}(|\alpha|,|\beta|)$ and the control over the variable mixer 32A reversed, to yield the same effect as the above embodiment. To generalize, the formula i MIN $(|\alpha|, |\beta|)-\text{j}\,||\alpha|-|\beta||$, with i and j being coefficients within the range of $-1$ to $+1$, can be used. (In the above embodiment, i=j=1.) Changing these coefficients is effectively equal to changing the fixed reference voltage 31, resulting in the same effect as the above embodiment. Accordingly, in determining the scope of the claims, these modifications should be construed as equivalent to the use of the computation described in the above embodiment.

Figure 11A:
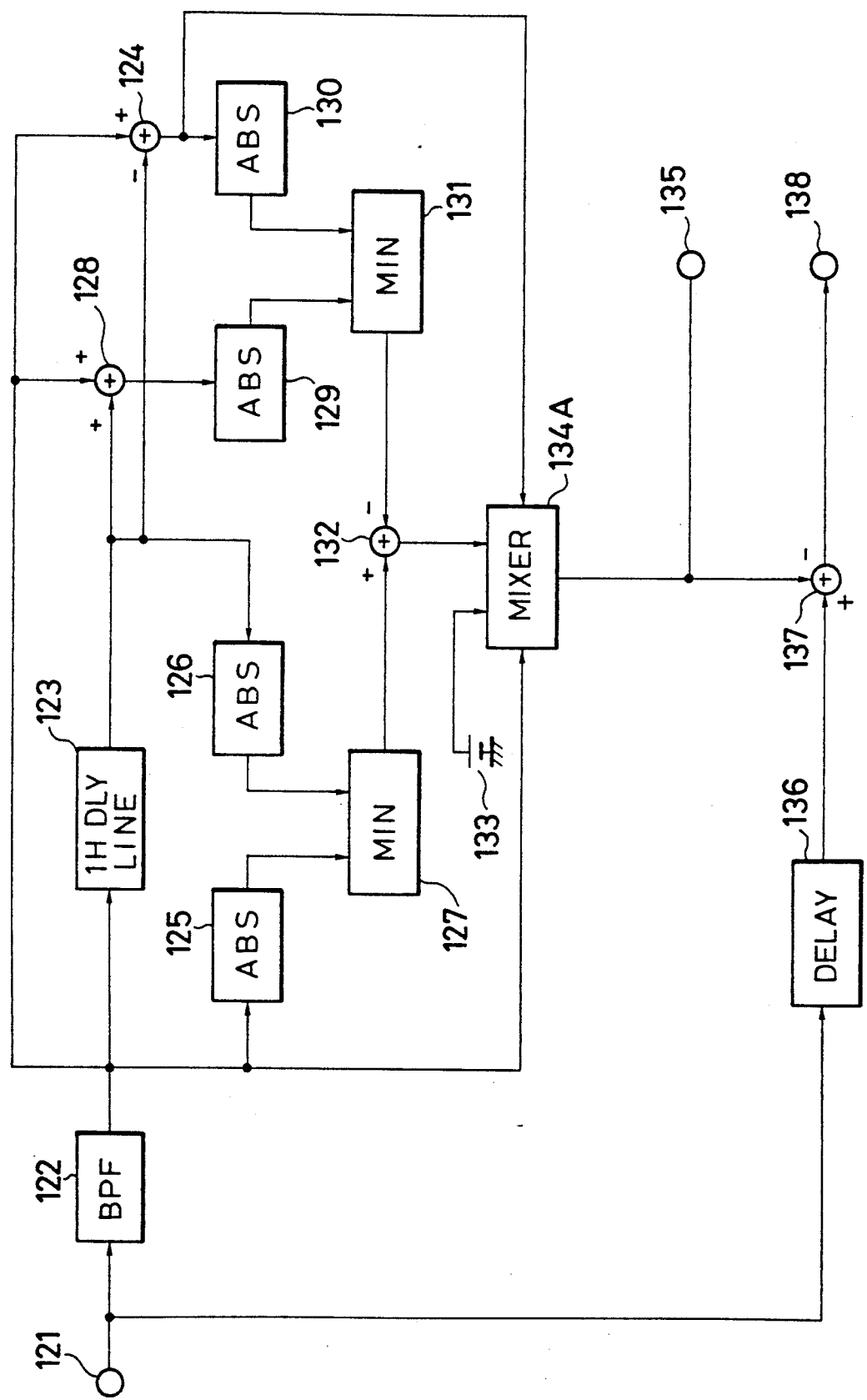
FIG. 11A is a block diagram of a modification of the embodiment of FIG. 11.

A further embodiment shown in FIG. 11A uses the computed signal from MIN $(|\alpha|, |\beta|)-\text{MIN}(|\alpha-\beta|, |\alpha+\beta|)$ in place of the above formula of the embodiment of FIG. 1A, and controls a variable mixer 134A so that when the computed signal is greater than the reference voltage, the comb filter mixing ratio is increased, and when less than the reference voltage, the original color carrier signal mixing ratio is increased. In other words, this embodiment of the invention concerns the provision and control of the variable mixer in place of the switching device 134 in the embodiment of FIG. 11.

The formula used in the above embodiment can be changed to MIN $(|\alpha-\beta|, |\alpha+\beta|)-\text{MIN}(|\alpha|, |\beta|)$ and the control over the variable mixer 134 reversed, to yield the same effect. To generalize, the formula i MIN $(|\alpha|, |\beta|)-\text{j MIN}(|\alpha-\beta|, |\alpha+\beta|)$, with i and j being coefficients with the range of $-1$ to $+1$, can be used. (In the above embodiment, i=j=1.) Changing these coefficients is effectively equal to changing the fixed reference voltage 133, resulting in the same effect as the above embodiment. Accordingly, in determining the scope of the claims, these modifications should be construed as equivalent to the use of the computation described in the above embodiment.

Figure 20A:
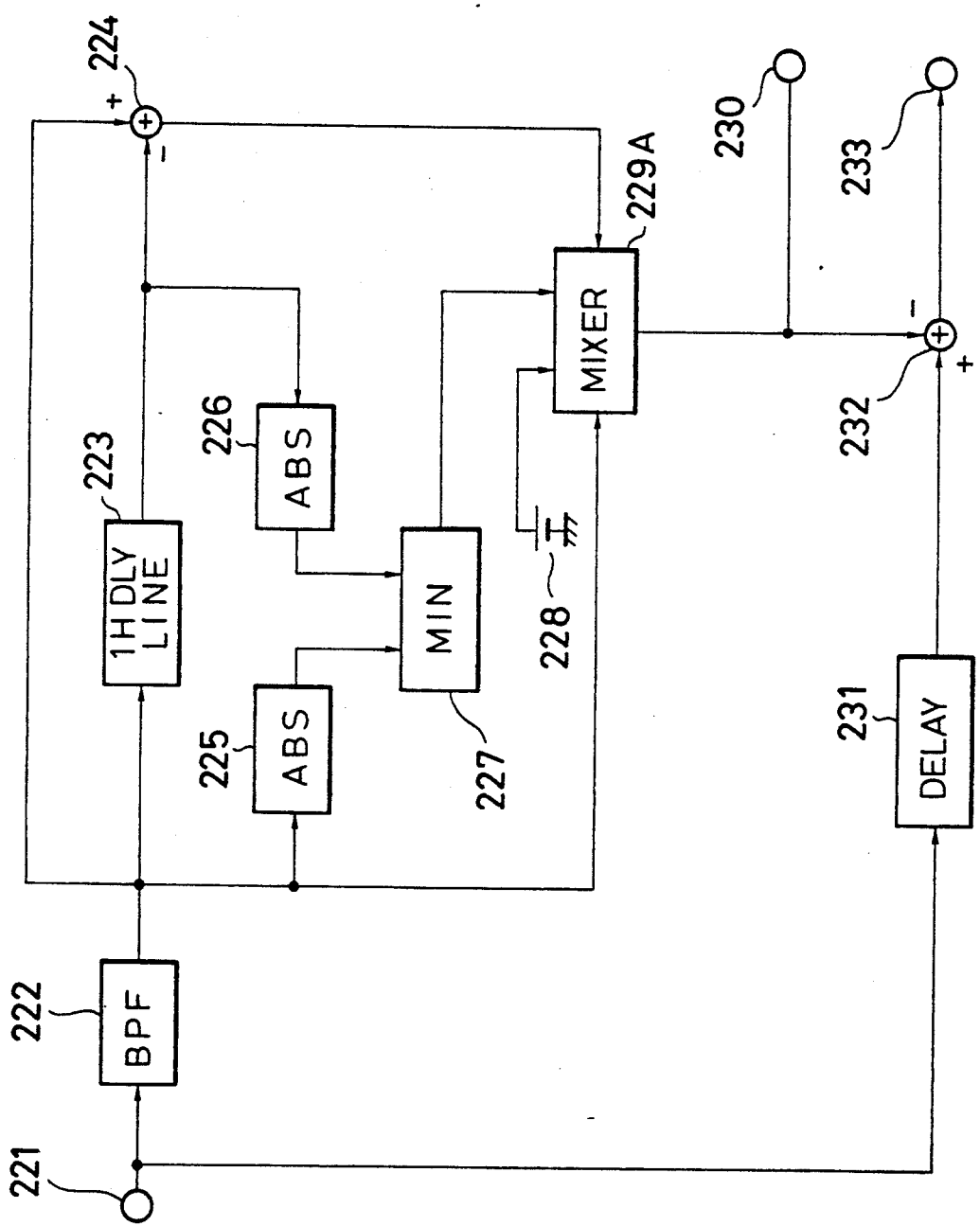
FIG. 20A is a block diagram of a modification of the embodiment of FIG. 20.

A further embodiment of the invention shown in FIG. 20A uses the computed signal of MIN $(|\alpha|, |\beta|)$ in place of the above formula of the embodiment of FIG. 1A. Viewed differently, this embodiment concerns the provision and control of a variable mixer 229A in place of the switching device 229 of the embodiment of FIG. 20.

Figure 31:
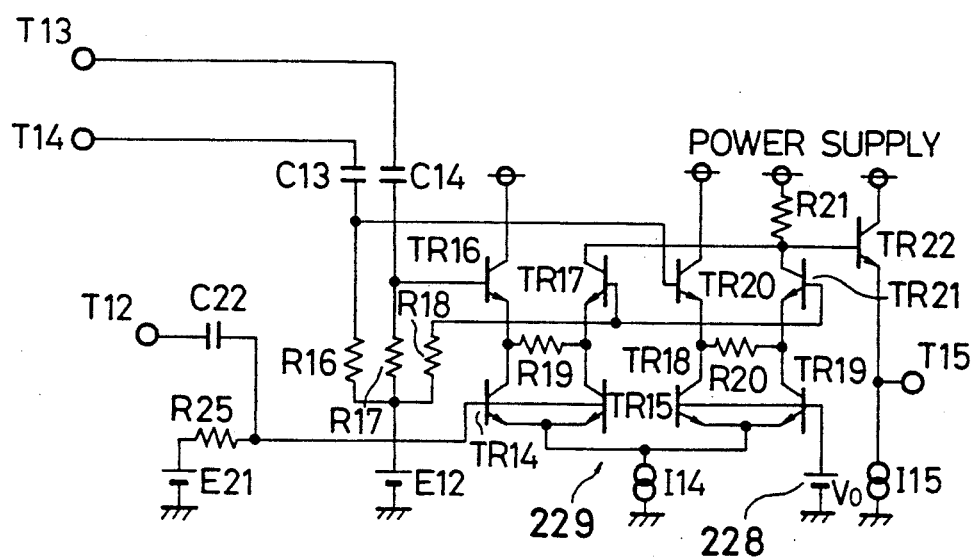
FIG. 31 shows an example of circuit that includes fixed reference voltage and variable mixer.
Figure 32:
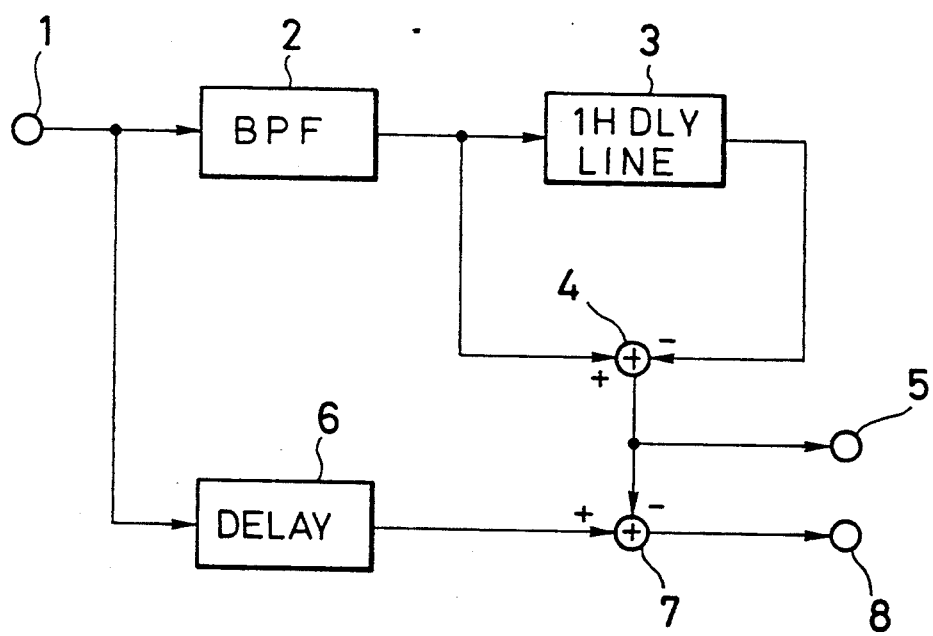
FIG. 32 is a block diagram showing a prior-art Y/C separator.

FIG. 31 illustrates a circuit example of a fixed reference voltage 228 and a variable mixer 229 which can be used in the seventh aspect of the invention.

In the figure, TR14–TR22 are NPN transistors, R16–R21 and R25 are resistors, I14 and I15 are constant current sources, E12 and E21 are constant DC bias voltages, C13, C14 and C22 are coupling capacitors, T12–T14 are input terminals and T15 is an output terminal.

The comb filtered signal input to the input terminal T13 is supplied to the base of the transistor TR16. The original signal from the bandpass filter 22 and input to the input terminal T14 is supplied to the base of transistor TR20. A fixed reference voltage 238 is supplied to the bases of the transistors TR18 and TR19. The transistors TR14–TR21 compose a variable mixer 229. Of these, the transistors TR16 and TR17, and the transistors TR20 and TR21 compose two non-inverting amplifiers. The transistors TR14 and TR15, and the transistors TR18 and TR19 control the currents through the amplifiers connected to their collectors thereby to control the gains of these amplifiers. The emitters of the transistors TR14, TR15, TR18 and TR19 are connected to the constant current source I14. The sum I0 of the currents through the transistors is fixed.

The bases of the transistors TR14 and TR15 are connected to each other, and the bases of the transistors TR18 and TR19 are connected to each other. Therefore, equal currents flow in the transistors TR14 and TR15, and in the transistors TR18 and TR19.

The formula used in the above embodiment can be changed to the formula to $-\text{MIN}(|\alpha|, |\beta|)$ and the control over the variable mixer 229 may be reversed, to yield the the same result. To generalize, the formula i MIN $(|\alpha|, |\beta|)$, with i being a coefficient with the range of $-1$ to $+1$, can be used. (In the above embodiment i=1). Changing this is effectively the same as changing the reference voltage 228 and would produce the same result. Accordingly, in determining the scope of the claims, these modifications should be construed as equivalent to the use of the computation described in the above embodiment.

Figure 23A:
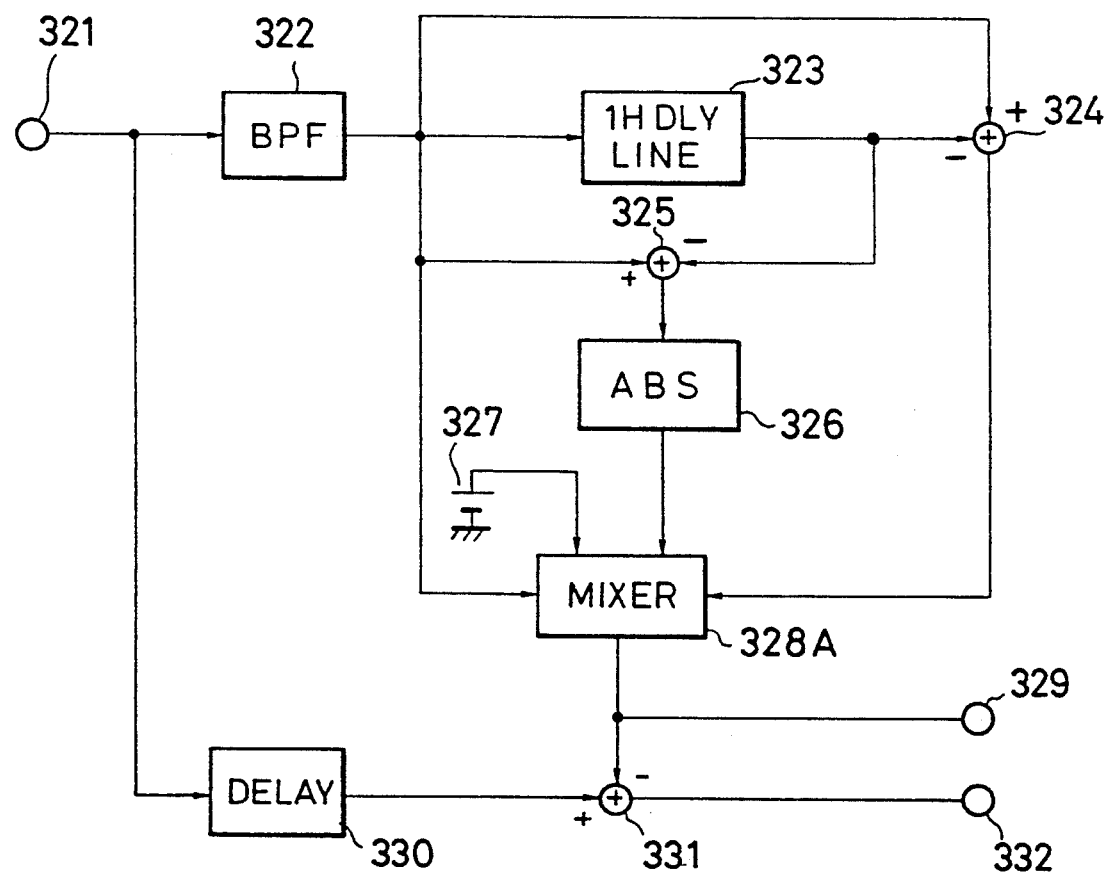
FIG. 23A is a block diagram of a modification of the embodiment of FIG. 23.

A further embodiment of the invention shown in FIG. 23A uses the computed signal from $|\alpha-\beta|$ in place of the above formula of the embodiment of FIG. 1A. Viewed differently, this embodiment uses a variable mixer 328A in place of the switching device 328 of the embodiment of FIG. 23.

The formula used in the above embodiment can be changed to $-\text{MIN}(|\alpha|, |\beta|)$ and the control over the variable mixer 328 reversed, to yield the same result. To generalize, the formula i $|\alpha-\beta|$, with i being a coefficient within the range of $-1$ to $+1$, can be used. (In the above embodiment, i=1.) Changing this coefficient is effectively the same as changing the reference voltage 327 and would produce the same result. Accordingly, in determining the scope of the claims, these modifications should be construed as equivalent to the use of the computation described in the above embodiment.

In the above embodiments, either the output of the bandpass filter or the comb filtered signal, or the mixture signal with varying mixing ratio is selected and output to the output terminal for the color carrier signal. The arrangement may alternatively be such that the comb filtered signal is always output to the output terminal for the color carrier signal, as in the conventional system, and the selected one of the signal of the color carrier signal band at the output of the bandpass filter and the comb filtered color carrier signal, or the mixture signal is subtracted from the composite vide signal, and the resultant signal is output to the output terminal for the luminance signal. With this arrangement, although the color error in the color signal cannot be eliminated or reduced, but the dot interference in the luminance signal can be eliminated or reduced.

As described in the foregoing, according to the Y/C separator of this invention, the relationship between any of the formulas:

i MIN $(|\alpha|, |\beta|)-j\,||\alpha|-|\beta||$, i MIN $(|\alpha|, |\beta|)-j$ MIN $(|\alpha-\beta|, |\alpha+\beta|)$ i MIN $(|\alpha|, |\beta|)$, and i $|\alpha-\beta|$, (with i and j being coefficients with the range of $-1$ to $+1$); and a reference voltage controls the selection of either the color carrier band original signal or a comb filtered signal. Also, by using any of the above formulas and a reference voltage to control a variable mixer to vary the mixing ratio between the color carrier band original signal and a comb filtered signal, more precise C separation is possible. Furthermore, by using this separated color carrier signal, more precise Y separation is possible. Defects such as color error in the color signal and dot interference in the luminance signal can be effectively improved.

What is claimed is:

1. A Y/C separator comprising:
computing means, responsive to a signal of a color carrier signal band in a Y/C composite video signal, and a delayed signal obtained by delaying said signal of the color carrier signal band by a 1 H period, for producing a computed signal in accordance with one of the following formulae:

(a) i MIN $(|\alpha|, |\beta|)-j\,||\alpha|-|\beta||$ (b) i MIN $(|\alpha|, |\beta|)-j$ MIN $(|\alpha-\beta|, |\alpha+\beta|)$ (c) i MIN $(|\alpha|, |\beta|)$ or (d) i $|\alpha-\beta|$ where
$\alpha$ = said signal of the color carrier signal band,
$\beta$ = said delayed signal,
MIN = a MINIMUM function, and
i and j = coefficients within the range of $-1$ to $+1$;
comb filter for comb filtering said signal of the color carrier signal band to produce a comb filtered signal; and
color carrier signal producing means, controlled by said computed signal and a reference voltage, for producing a color carrier signal in accordance with said signal of the color carrier signal band and said comb filtered signal.

2. The Y/C separator of claim 1, wherein said computing means performs computation (a), where i and j equal 1.

3. The Y/C separator of claim 2, wherein said computing means comprises:
a first absolute value converter for producing an absolute value of said signal of the color carrier signal band;
a second absolute value converter for producing an absolute value of said delayed signal;
a first subtractor for producing a difference between the output signal of said first absolute value converter and the output signal of said second absolute value converter;
a third absolute value converter for producing an absolute value of the output signal of said first subtractor;
a minimum value selector for producing a signal having a lower level of the output signal of said first absolute value converter and the output signal of said second absolute value converter; and
a second subtractor for producing a difference between the output signal of said third absolute value converter and the output signal of said minimum value selector;
the output of said second subtractor constituting said computed signal.

4. The Y/C separator of claim 1, wherein said computing means performs computation (b), where i and j equal 1.

5. The Y/C separator of claim 4, wherein said computing means comprises:
a first absolute value converter for producing an absolute value of said signal of the color carrier signal band;
a second absolute value converter for producing an absolute value of said delayed signal;
a third absolute value converter for producing an absolute value of a signal obtained by adding said signal of the color carrier signal band to said delayed signal;
a fourth absolute value converter for producing an absolute value of a signal obtained by subtracting said delayed signal from said signal of the color carrier signal band;
a first minimum value selector for producing a signal having a lower level of the output signal of said first absolute value converter and the output signal of said second absolute value converter;
a second minimum value selector for producing a signal having a lower level of the output signal of said third absolute value converter and the output signal of said fourth absolute value converter; and
a subtractor for producing a difference between the output signal of said first minimum value selector and the output signal of said second minimum value selector;
the output of said subtractor constituting said computed signal.

6. The Y/C separator of claim 1, wherein said computing means performs computation (c), where i equals 1.

7. The Y/C separator of claim 6, wherein said computing means comprises:
a first absolute value converter for producing an absolute value of said signal of the color carrier signal band;
a second absolute value converter for producing an absolute value of said delayed signal; and
a minimum value selector for producing a signal having a lower level of the output signal of said first absolute value converter and the output signal of said second absolute value converter;
the output of said minimum value selector constituting said computed signal.

8. The Y/C separator of claim 1, wherein said computing means performs computation (d), where i equals 1.

9. The Y/C separator of claim 8, wherein said computing means comprises:
- a subtractor for producing a difference between said signal of the color carrier signal band and said delayed signal; and
- an absolute value converter for producing an absolute value of the output signal of said subtractor;
- the output of said absolute value converter constituting said computed signal.

10. The Y/C separator of claim 1, wherein said color carrier signal producing means includes a switching device controlled by said computed signal and said reference voltage for selectively outputting, as said color carrier signal, one of said signal of the color carrier signal band and said comb filtered signal.

11. The Y/C separator of claim 1, wherein the color carrier signal producing means includes a variable mixer controlled by said computed signal and said reference voltage for producing the color carrier signal with a varied mixing ratio between said signal of the color carrier signal band and said comb filtered signal.

12. The Y/C separator of claim 1, further comprising means for producing a luminance signal from said color carrier signal and said Y/C composite video signal.

13. The Y/C separator of claim 12, wherein said means for producing the luminance signal includes a subtractor for subtracting said color carrier signal from said Y/C composite video signal.

14. The Y/C separator of claim 1, further comprising:
- a 1 H delay means for delaying said signal of the color carrier signal band; and
- a subtractor subtracting the output of said 1 H delay means from said signal of the color carrier signal band to produce said comb filtered signal;
- said computing means using the output of said 1 H delay means as said delayed signal.

15. The Y/C separator of claim 1, wherein said reference voltage is of a fixed value.

* * * * *